(12) United States Patent
Sen et al.

(10) Patent No.: US 11,174,166 B2
(45) Date of Patent: Nov. 16, 2021

(54) METHODS FOR FORMING POROUS NANOTUBE FABRICS

(71) Applicant: ZEON Corporation, Tokyo (JP)

(72) Inventors: Rahul Sen, Lexington, MA (US); Joseph James McDermott, Watertown, MA (US); Sushanta K. Pal, Chelmsford, MA (US); Thomas Rueckes, Byfield, MA (US)

(73) Assignee: ZEON Corporation, Tokyo (JP)

( * ) Notice: Subject to any disclaimer, the term of this patent is extended or adjusted under 35 U.S.C. 154(b) by 77 days.

(21) Appl. No.: 16/722,779

(22) Filed: Dec. 20, 2019

(65) Prior Publication Data

US 2021/0188644 A1 Jun. 24, 2021

(51) Int. Cl.
*C01B 32/166* (2017.01)
*B82Y 40/00* (2011.01)
*D01F 9/127* (2006.01)
*B82Y 30/00* (2011.01)

(52) U.S. Cl.
CPC .......... *C01B 32/166* (2017.08); *B82Y 40/00* (2013.01); *D01F 9/127* (2013.01); *B82Y 30/00* (2013.01); *C01B 2202/02* (2013.01)

(58) Field of Classification Search
CPC . C01B 32/166; C01B 2202/02; C01B 32/158; C01B 32/159; C01B 32/16; C01B 32/162; C01B 32/164; C01B 32/168; C01B 32/17; C01B 32/172; C01B 32/174; C01B 32/176; C01B 32/178; C01B 2202/00; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B82Y 40/00; B82Y 30/00; D01F 9/127

See application file for complete search history.

(56) References Cited

PUBLICATIONS

Luo, et al., Porous PDMS / CNF Nanocomposites for Sensing Applications, Proceedings of the Nanotech France 2018 International Conference Paris, France, Jun. 27-29, 2018, pp. 1-4 (Year: 2018).*

* cited by examiner

*Primary Examiner* — Daniel C. McCracken
(74) *Attorney, Agent, or Firm* — Kenja IP Law PC

(57) ABSTRACT

Methods for making porous nanotube fabrics are disclosed. Within the methods of the present disclosure, a porogen-loaded nanotube application solution is formed by combining a first volume of nanotube elements with a second volume of fuel material in a liquid medium to form a porogen-loaded nanotube application solution. In some aspects of the present disclosure, a third volume of oxidizer material is also combined into the liquid medium. A porogen-loaded nanotube fabric is formed by depositing the porogen-loaded nanotube application solution. In some aspects of the present disclosure, the fuel material within the porogen-loaded nanotube application solution will react with oxidizer material when heat is applied to a sufficient degree and volatize. The off-gassed fuel material will then leave behind voids in the nanotube fabric, rendering the fabric porous.

29 Claims, 20 Drawing Sheets

|  | Sample #1 (Control) | Sample #2 (Low NH$_4$NO$_3$) | Sample #3 (High NH$_4$NO$_3$) |
|---|---|---|---|
| CNT Concentration | 650 ppm | 650 ppm | 650 ppm |
| Fuel Concentration (Poloxamer 407) | None | 500 ppm | 500 ppm |
| Oxidizer Concentration (NH$_4$NO$_3$) | 86 ppm (15 ppm as N) | 86 ppm (15 ppm as N) | 285 ppm (50 ppm as N) |
| Total Pore Count | 423 | 899 | 1743 |
| Avg. Pore Size | 44 nm | 57 nm | 95 nm |
| Pore Area (as % of image) | ~ 1% | ~ 3% | ~ 9% |

FIG. 12

METHODS FOR FORMING POROUS NANOTUBE FABRICS

TECHNICAL FIELD

The present disclosure relates generally to nanotube fabric layers and films and, more specifically, to methods for forming nanotube fabrics using porogen-loaded nanotube application solutions.

CROSS-REFERENCE TO RELATED APPLICATIONS

This application is related to the following U.S. patents, which are assigned to the assignee of the present application, and are hereby incorporated by reference in their entirety:

Methods of Nanotube Films and Articles (U.S. Pat. No. 6,835,591), filed Apr. 23, 2002;

Methods of Using Pre-Formed Nanotubes to Make Carbon Nanotube Films, Layers, Fabrics, Ribbons, Elements, and Articles (U.S. Pat. No. 7,335,395), filed Jan. 13, 2003;

Methods of Making Carbon Nanotube Films, Layers, Fabrics, Ribbons, Elements, and Articles (U.S. Pat. No. 7,566,478), filed Jan. 13, 2003;

Devices Having Horizontally-Disposed Nanofabric Articles and Methods of Making the Same (U.S. Pat. No. 7,259,410), filed Feb. 11, 2004;

Devices Having Vertically-Disposed Nanofabric Articles and Methods of Making Same (U.S. Pat. No. 6,924,538), filed Feb. 11, 2004;

Spin-Coatable Liquid for Formation of High Purity Nanotube Films (U.S. Pat. No. 7,375,369), filed Jun. 3, 2004.

High Purity Nanotube Fabrics and Films (U.S. Pat. No. 7,858,185), filed Jun. 3, 2004;

Resistive Elements Using Carbon Nanotubes (U.S. Pat. No. 7,365,632), filed Sep. 20, 2005;

Two-Terminal Nanotube Devices and Systems and Methods of Making Same (U.S. Pat. No. 7,781,862), filed Nov. 15, 2005;

Aqueous Carbon Nanotube Applicator Liquids and Methods for Producing Applicator Liquids Thereof (U.S. Pat. No. 7,666,382), filed Dec. 15, 2005;

Nonvolatile Nanotube Diodes and Nonvolatile Nanotube Blocks and Systems using Same and Methods of Making Same (U.S. Pat. No. 8,217,490), filed Aug. 8, 2007;

Carbon Nanotubes for the Selective Transfer of Heat from Electronics (U.S. Pat. No. 7,927,992), filed Mar. 6, 2008;

Anisotropic Nanotube Fabric Layers and Films and Methods of Forming Same (U.S. Pat. No. 8,937,575), filed Jul. 31, 2009;

Nanotube Solution Treated with Molecular Additive, Nanotube Film Having Enhanced Adhesion Property, and Methods for Forming the Nanotube Solution and the Nanotube Film (U.S. Pat. No. 9,634,251), filed Mar. 9, 2009;

Methods for Controlling Density, Porosity, and/or Gap Size within Nanotube Fabric Layers and Films (U.S. Pat. No. 9,617,151), filed Oct. 31, 2012;

Nanotube Solutions With High Concentration And Low Contamination And Methods For Purifiying Nanotube Solutions (U.S. Pat. No. 10,069,072), filed May 31, 2013; and Low Defect Nanotube Application Solutions and Fabrics and Methods for Making Same (U.S. Pat. No. 9,650,732), filed Apr. 30, 2014.

This application is related to the following patent application, which is assigned to the assignee of the application, and are hereby incorporated by reference in their entirety:

Scalable Nanotube Fabrics and Methods for Making Same (U.S. patent application Ser. No. 14/033,158, now published as US2015-0086771), filed Sep. 20, 2013.

Methods for Forming Nanotube Fabrics with Controlled Surface Roughness and Degree of Rafting (U.S. patent application Ser. No. 16/413,746, now published as US 2019-0292057), filed May 16, 2019.

Methods for Characterizing Nanotube Formulations for Nanotube Fabrics with Controlled Surface Roughness and Degree of Rafting (U.S. patent application Ser. No. 16/413,731), filed May 16, 2019.

BACKGROUND

Any discussion of the related art throughout this specification should in no way be considered as an admission that such art is widely known or forms part of the common general knowledge in the field.

Nanotube fabric layers and films are used in a plurality of electronic structures, and devices. For example, U.S. Pat. No. 8,217,490 to Bertin et al., incorporated herein by reference in its entirety, teaches methods of using nanotube fabric layers to realize nonvolatile devices such as, but not limited to, block switches, programmable resistive elements, and programmable logic devices. U.S. Pat. No. 7,365,632 to Bertin et al., incorporated herein by reference, teaches the use of such fabric layers and films within the fabrication of thin film nanotube based resistors. U.S. Pat. No. 7,927,992 to Ward et al., incorporated herein by reference in its entirety, teaches the use of such nanotube fabrics and films to form heat transfer elements within electronic devices and systems.

Through a variety of previously known techniques (described in more detail within the incorporated references) nanotube elements can be rendered conducting, non-conducting, or semi-conducting before or after the formation of a nanotube fabric layer or film, allowing such nanotube fabric layers and films to serve a plurality of functions within an electronic device or system. Further, in some cases the electrical conductivity of a nanotube fabric layer or film can be adjusted between two or more non-volatile states as taught in U.S. Pat. No. 7,781,862 to Bertin et al., incorporated herein by reference in its entirety, allowing for such nanotube fabric layers and films to be used as memory or logic elements within an electronic system.

U.S. Pat. No. 7,335,395 to Ward et al., incorporated herein by reference in its entirety, teaches a plurality of methods for forming nanotube fabric layers and films on a substrate element using preformed nanotubes. The methods include, but are not limited to, spin coating (wherein a solution of nanotubes is deposited on a substrate which is then spun to evenly distribute said solution across the surface of said substrate), spray coating (wherein a plurality of nanotube are suspended within an aerosol solution which is then dispersed over a substrate), and dip coating (wherein a plurality of nanotubes are suspended in a solution and a substrate element is lowered into the solution and then removed). Further, U.S. Pat. No. 7,375,369 to Sen et al., incorporated herein by reference in its entirety, and U.S. Pat. No. 7,666,382 to Ghenciu et al., incorporated herein by reference in its entirety, teach nanotube solutions well suited for forming a nanotube fabric layer over a substrate element via a spin coating process.

SUMMARY OF THE DISCLOSURE

The current disclosure relates to porogen-loaded nanotube formulations, nanotube fabrics formed from porogen-loaded nanotube formulations, and methods for volatizing porogen material within those formulations to form porous nanotube fabrics.

In particular, the present disclosure provides a method for forming a porous nanotube fabric. This method first comprises combining a first volume of nanotube elements and a second volume of fuel material in a liquid medium to form a porogen-loaded nanotube application solution. The method next comprises depositing the porogen-loaded nanotube application solution over a material layer to form a porogen-loaded nanotube fabric. The method next comprises heating the porogen-loaded nanotube fabric to volatize the fuel material within the porogen-loaded nanotube fabric to form a porous nanotube fabric, wherein the step of heating volatizes substantially all of the fuel material.

According to one aspect of the present disclosure, the method further comprises combining a third volume of oxidizer material into the porogen-loaded nanotube application solution.

Under another aspect of the present disclosure, the fuel material is a material comprising a two-part molecule that includes a fuel part and an oxidizer part.

Under another aspect of the present disclosure, the step of heating induces an in-situ reaction between the fuel material and the oxidizer material.

Under another aspect of the present disclosure, substantially all of the fuel material is volatized and off-gassed.

Under another aspect of the present disclosure, substantially all of the oxidizer material present in the porogen-loaded nanotube fabric is volatized and off-gassed.

Under another aspect of the present disclosure, the fuel material is a material that will thermally decompose when heated.

Under another aspect of the present disclosure, the porogen-loaded nanotube fabric is heated in an atmosphere that includes an ambient oxidizer such as air.

Under another aspect of the present disclosure, the porogen-loaded nanotube fabric is heated in an inert atmosphere.

Under another aspect of the present disclosure, the porous nanotube fabric has a porosity of greater than or equal to approximately 3%, 5%, 10%, 15%, or 20%.

Under another aspect of the present disclosure, the nanotube elements are carbon nanotubes.

Under another aspect of the present disclosure, the nanotube elements are single-walled nanotubes.

Under another aspect of the present disclosure, the nanotube elements are multi-walled nanotubes.

Under another aspect of the present disclosure, the nanotube elements are a mixture of single-walled nanotubes and multi-walled nanotubes.

Other features and advantages of the present invention will become apparent from the following description of the invention which is provided below in relation to the accompanying drawings.

BRIEF DESCRIPTION OF THE DRAWINGS

FIG. 12 is a table summarizing the results from a first example of the present disclosure that forms three different fabrics and measures their porosity.

DETAILED DESCRIPTION

Figure 1A:
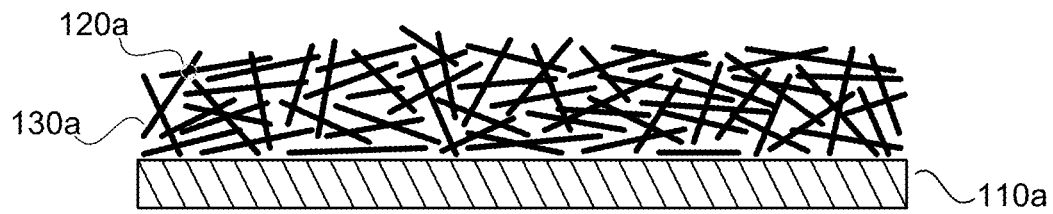
FIG. 1A is a diagram illustrating an exemplary non-porous nanotube fabric.

The present disclosure teaches methods for making porous nanotube fabrics using a porogen fuel material deposited in-solution with the nanotubes during fabric formation. Within one aspect of the present disclosure, a first volume of nanotubes and a second volume of porogen fuel material are combined in a liquid medium to form a porogen-loaded nanotube application solution. The porogen-loaded solution is then deposited (via, for example, a spin coating operation) over a material layer to form a porogen-loaded nanotube fabric that is a composite mixture of nanotube elements and porogen fuel material. According to the methods of the present disclosure, the fuel material within the porogen-loaded nanotube fabric can then be volatized in-situ and off-gassed, leaving a plurality of gaps and voids within the fabric and rendering the porogen-loaded nanotube fabric into a porous nanotube fabric.

As will be discussed below with respect to the four exemplary methods of the present disclosure, the in-situ volatilization of the fuel material within a porogen-loaded nanotube fabric may or may not require the presence of an oxidizer. Within some aspects of the present disclosure, an oxidizer material is mixed into the porogen-loaded nanotube application solution, providing an in-situ reactant for an in-situ reaction under applied heat. In other aspects of the present disclosure, a porogen-loaded nanotube fabric is placed within an atmosphere that includes an ambient oxidizer (e.g., air with 21% oxygen), and this ambient oxidizer reacts with the in-situ fuel material in an reaction under applied heat. In other aspects of the present disclosure, the porogen fuel material is a material that will thermally decompose under applied heat, and no oxidizer is required for in-situ volatilization of the porogen fuel material.

Within certain applications, the porosity of a nanotube fabric can have an effect on the electrical and physical properties of the nanotube fabric or within a device employing the nanotube fabric. For example, within two terminal nanotube switching devices (discussed in detail within the incorporated references), the porosity of the nanotube fabric used within a device can influence the switching voltage, resistance, and adjustable resistance range of such a device. Further, the porosity of a nanotube fabric used within two terminal nanotube switching devices can also impact the uniformity of the distance between the top and bottom electrodes, which can, in certain embodiments, affect how the devices function and potentially limit the scalability of the devices. The porosity of a nanotube fabric can also significantly impact how other material layers applied over the nanotube fabric form, creating differences in both electrical and physical characteristics of devices using these nanotube fabrics. To this end, the methods of the present disclosure can, in certain aspects, be used to form engineered nanotube fabrics wherein the porosity of the nanotube fabric can be reliably controlled as best fits the needs of a particular application.

As will be shown in Example 1 below (with respect to FIGS. 12, 13A-13B, 14A-14B, and 15A-15B), one method for quantifying the porosity of a nanotube fabric is to visually analyze an SEM of a nanotube fabric and calculate the percentage of the image representative of pore area. Using such a method, the relative porosities of different fabrics can be compared. As shown in FIG. 12 (discussed in detail below with respect to Example 1), a non-porous nanotube fabric was observed to have a porosity of 1%. Within that same example, two porous nanotube fabrics were shown to have porosities of 3% and 9%, respectively. To this end, within certain aspects of the present disclosure, a porous nanotube fabric can be defined as a nanotube fabric with an observable porosity above a selected threshold value. This selected threshold value may vary dependent on the needs of a particular application (for example, but not limited to, above approximately 3%, above approximately 5%, above approximately 10%, above approximately 15%, or above approximately 20%).

Within the present disclosure, the term "nanotube formulation" is used to describe nanotube application solutions—that is a plurality of nanotube elements suspended within a liquid medium capable of being deposited to form a nanotube fabric—with a selected set of parameters. Such parameters can include, but are not limited to, the type of nanotube or nanotubes used within the application solution, the nanotube wall type (e.g., single walled, double walled, or multi-walled), the type and degree of functionalization (or lack thereof) of the nanotube elements, the lengths and length distribution of the nanotube elements, the degree to which the nanotube elements are straight or kinked, the density of the nanotube elements within solution, the purity of the application solution (e.g., level of metallic impurities), the chirality of the nanotube elements, and the liquid medium used.

A fabric of nanotubes as referred to herein for the present disclosure includes a layer of multiple, interconnected carbon nanotubes. A fabric of nanotubes (or nanofabric), in the present disclosure, e.g., a non-woven carbon nanotube (CNT) fabric, may, for example, have a structure of multiple entangled nanotubes that are irregularly arranged relative to one another. Alternatively, or in addition, for example, the fabric of nanotubes for the present disclosure may possess some degree of positional regularity of the nanotubes, e.g., some degree of parallelism along their long axes. Such positional regularity may be found, for example, on a relatively small scale wherein flat arrays of nanotubes are arranged together along their long axes in rafts on the order of one nanotube long and ten to twenty nanotubes wide. In other examples, such positional regularity may be found on a larger scale, with regions of ordered nanotubes, in some cases, extended over substantially the entire fabric layer.

The fabrics of nanotubes retain desirable physical properties of the nanotubes from which they are formed. For example, in some electrical applications, the fabric preferably has a sufficient amount of nanotubes in contact so that at least one ohmic (metallic) or semiconductive pathway exists from a given point within the fabric to another point within the fabric. Single walled nanotubes may typically have a diameter of about 1-3 nm, and multi walled nanotubes may typically have a diameter of about 3-30 nm. Nanotubes may have lengths ranging from about 0.2 microns to about 200 microns, for example. The nanotubes may curve and occasionally cross one another. Gaps in the fabric, i.e., between nanotubes either laterally or vertically, may exist. Such fabrics may include single-walled nanotubes, multi-walled nanotubes, or both.

The fabric may have small areas of discontinuity with no tubes present. The fabric may be prepared as a layer or as multiple fabric layers, one formed over another. The thickness of the fabric can be chosen as thin as substantially a monolayer of nanotubes or can be chosen much thicker, e.g., tens of nanometers to hundreds of microns in thickness. The porosity of the fabrics can vary from low density fabrics with high porosity to high density fabrics with low porosity. Such fabrics can be prepared by growing nanotubes using chemical vapor deposition (CVD) processes in conjunction with various catalysts, for example.

Other methods for generating such fabrics may involve using spin-coating techniques and spray-coating techniques with preformed nanotubes suspended in a suitable solvent, silk screen printing, gravure printing, and electrostatic spray coating. Nanoparticles of other materials can be mixed with suspensions of nanotubes in such solvents and deposited by spin coating and spray coating to form fabrics with nanoparticles dispersed among the nanotubes.

As described within U.S. Pat. No. 7,375,369 to Sen et al. and U.S. Pat. No. 7,666,382 to Ghenciu et al., both incorporated herein by reference in their entirety, nanotube fabrics and films can be formed by applying a nanotube application solution (for example, but not limited to, a plurality of nanotube elements suspended within an aqueous solution) over a substrate element. A spin coating process, for example, can be used to evenly distribute the nanotube elements over the substrate element, creating a substantially uniform layer of nanotube elements. In other cases, other processes (such as, but not limited to, spray coating processes, dip coating processes, silk screen printing processes, and gravure printing processes) can be used to apply and distribute the nanotube elements over the substrate element. In other cases, CVD growth of nanotubes on a material surface may be used to realize an unordered nanotube fabric layer.

Further, U.S. Pat. No. 9,617,151 to Sen et al., incorporated herein by reference in its entirety, teaches methods of adjusting certain parameters (for example, the nanotube density or the concentrations of certain ionic species) within nanotube application solutions to either promote or discourage rafting—that is, the tendency for nanotube elements to group together along their sidewalls and form dense, raft-like structures—within a nanotube fabric layer formed with such a solution. By increasing the incidence of rafting within nanotube fabric layers, the density of such fabric layers can be increased, reducing both the number and size of voids and gaps within such fabric layers.

It should be noted that nanotube elements used and referenced within the embodiments of the present disclosure may be single-walled nanotubes, multi-walled nanotubes, or mixtures thereof and may be of varying lengths. Further, the nanotubes may be conductive, semiconductive, or combinations thereof. Further, the nanotubes may be functionalized (for example, by oxidation with nitric acid resulting in alcohol, aldehydic, ketonic, or carboxylic moieties attached to the nanotubes), or they may be non-functionalized.

It should be noted that the methods of the present disclosure are well suited for arranging functionalized nanotube elements within a nanotube fabric layer. Nanotube elements may be functionalized for a plurality of reasons. For example, certain moieties may be formed on the sidewalls of nanotube elements to add in the dispersion of those elements within an application solution. In another example, certain moieties formed on the sidewalls of nanotube elements can aid in the efficient formation of a nanotube fabric. In a further example, nanotube elements can be functionalized with certain moieties such as to electrically insulate the sidewalls of the nanotube elements. Nanotube elements can be functionalized by attaching organic, silica, or metallic moieties (or some combination thereof) to the sidewalls of the nanotube elements. Such moieties can interact with nanotube elements covalently or remain affixed through 7C-7C bonding.

Carbon nanotube (CNT) raw materials normally come in dry powder form. In order to integrate the manufacturing of nanotube devices with existing semiconductor facilities, it is often necessary to prepare a spin- or spray-coatable nanotube solution or dispersion before use. Accordingly, the nanotube powder has to be suspended, dispersed, solvated, or mixed in a liquid medium or solvent, so as to form a nanotube solution or dispersion. In some cases, this liquid medium could be water (including, but not limited to, distilled water or deionized water). In other cases, this liquid medium could be a non-aqueous solvent. The nanotube solution formed directly from CNT raw materials may be referred to as a "pristine" nanotube solution. In this disclosure, the term "nanotube solution," "nanotube suspension," and "nanotube dispersion" may be used interchangeably to refer to the same thing. The nanotube solution may be an aqueous or non-aqueous solution, and the solvent may be water or an organic/inorganic liquid. In one embodiment, the nanotube solution is an aqueous solution and the solvent is water.

To fabricate memory and/or logic devices in an industrial scale, there is a need to develop a CMOS-grade formulation of nanotube dispersions. The CMOS-grade formulation may require that the nanotube dispersions be of ultra-high purity, that is, substantially free from surfactants, trace metals, and/or other additives. In some cases, substantially free may refer to a concentration of less than or equal to 1 part-per-billion (ppb). Accordingly, extensive purification processes may be performed to the nanotube solution. In some embodiments, the purification processes may include one or more of a cross-flow filtration (CFF) process, a vacuum filtration process, sonication, centrifugation, treatments of certain chemicals, and/or any combinations thereof. Exemplary methods for purifying nanotube solutions have been disclosed in U.S. Pat. No. 10,069,072 to Roberts et al., the contents of which are incorporated herein by reference in their entirety.

FIG. 1A is an illustration 101 representative of an exemplary non-porous nanotube fabric. A plurality of nanotubes 130a are distributed over a material layer 110a to form the fabric. As described above, nanotubes 130a can be, in certain aspects of the present disclosure, solution deposited nanotubes formed into a network of interconnected, freely formed nanotubes. A plurality of junctions 120a among the individual nanotube elements provides a conductive path through the fabric 101.

Figure 1B:
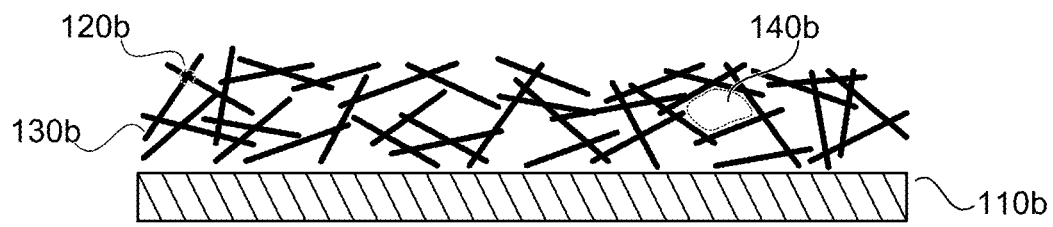
FIG. 1B is a diagram illustrating an exemplary porous nanotube fabric formed using the methods of the present disclosure.

FIG. 1B is an illustration 102 representative of an exemplary porous nanotube fabric formed using the methods of the present disclosure. As with the non-porous fabric shown in FIG. 1A, a plurality of nanotubes 130b are distributed over a material layer 110b to form the fabric. Within the exemplary nanotube fabric of FIG. 1B, however, a plurality of pores 140b are present throughout the fabric. These pores 140b provide, among other electrical and physical differences, that the porous fabric has fewer nanotube junctions 120b across the fabric as compared to a porous fabric (as is shown in FIG. 1A).

As taught within some of the incorporated references discussed above, a nanotube fabric (such as the non-porous nanotube fabric of FIG. 1A and the porous nanotube fabric of FIG. 1B, discussed above) can be adjusted among a plurality of non-volatile resistive states via the application of electrical stimuli across the fabric. Without wishing to be bound by theory, in such applications this applied electrical stimuli can be used to make or break the electrical conductivity of these junctions (120a and 120b), increasing or decreasing the electrical resistance of the nanotube fabric. Within certain applications, the number of nanotube junctions (120a and 120b) within a fabric—or, taken another way, the density of these junctions throughout a fabric—can affect the electrical parameters of that nanotube fabric. Such electrical parameters include, but are not limited to, the adjustable resistive range of the nanotube fabric, the resistance values of the nonvolatile resistive states, the voltage and/or current required to adjust a nanotube fabric from one non-volatile resistive state to another, and the initial resistance of the nanotube fabric after it is formed. For example, in certain applications, fewer nanotube junctions 120b within a fabric would provide that fabric with lower switching voltage and current requirements to adjust the fabric between non-volatile resistive states. In another example, a porous fabric might exhibit a smaller range over which the electrical resistance of a nanotube fabric can be adjusted. Also, as shown in FIGS. 1A and 1B, porous nanotube fabrics use fewer nanotube elements (130a and 130b) as compared to non-porous fabrics for fabrics of similar geometric dimensions. As such, within certain applications, a porous nanotube fabric will require significantly fewer nanotubes and be less costly to produce as compared to a porous nanotube fabric of the same geometric dimensions.

This is to say that, in certain applications, a porous nanotube fabric may be more desirable and better suited for an application than a non-porous one. For example, within a particular design for an array of two terminal non-volatiles switching elements (as described above with respect to the incorporated references), lower switching voltages, a tighter range of resistive values over which the array elements can be adjusted, and a lower material cost may be critical design elements. Within such an example, a porous nanotube fabric might be more favorable than a non-porous one. To this end, the present disclosure provides methods for forming porous nanotube fabrics.

It should be noted that the exemplary nanotube fabrics detailed in FIGS. 1A and 1B (as well as the illustrations within FIGS. 2A-2B, 4A-4B, 6A-6B, and 8A-8B, discussed below) are intended as simplified functional examples used to illustrate some of the structural differences between porous and non-porous nanotube fabrics as relates to the methods of the present disclosure. For clarity, the relative shapes, sizes, positions, and quantities of nanotube elements 130a and 130b have been greatly simplified for ease of explanation purposes. That is, the nanotube fabrics detailed in FIGS. 1A-1B, 2A-2B, 4A-4B, 6A-6B, and 8A-8B are intended only to be used to illustrate a relevant mechanism of nanotube fabric formation with respect to differing levels of porosity. As such, no realistic values for nanotube size or type, nanotube interactions or interconnections, relative positions, alignment, or orientations is intended or should be inferred.

Figure 2A:
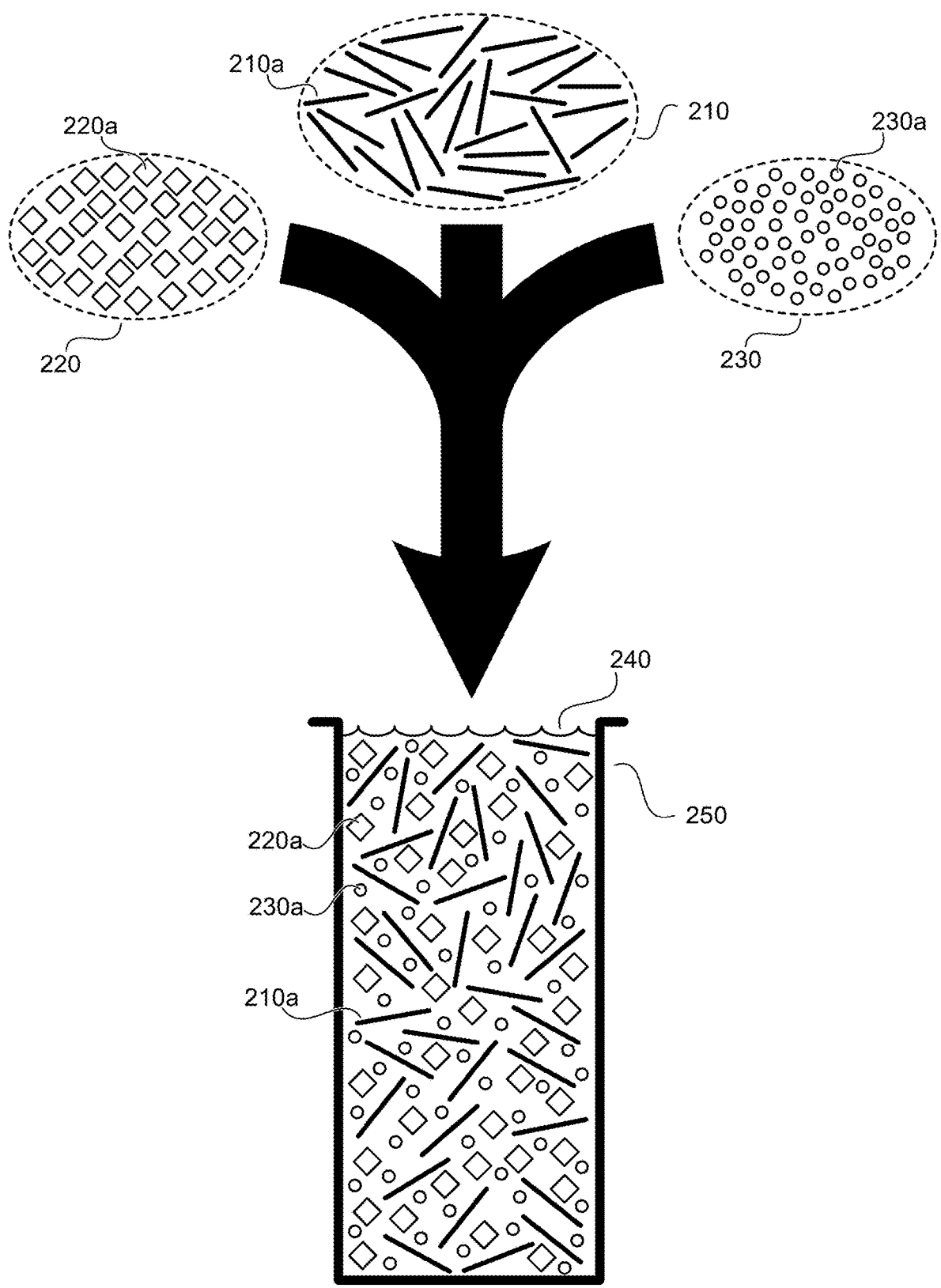
FIG. 2A is a diagram illustrating a first type of porogen-loaded nanotube application solution that includes both fuel material and oxidizer material according to the methods of the present disclosure.
Figure 2B:
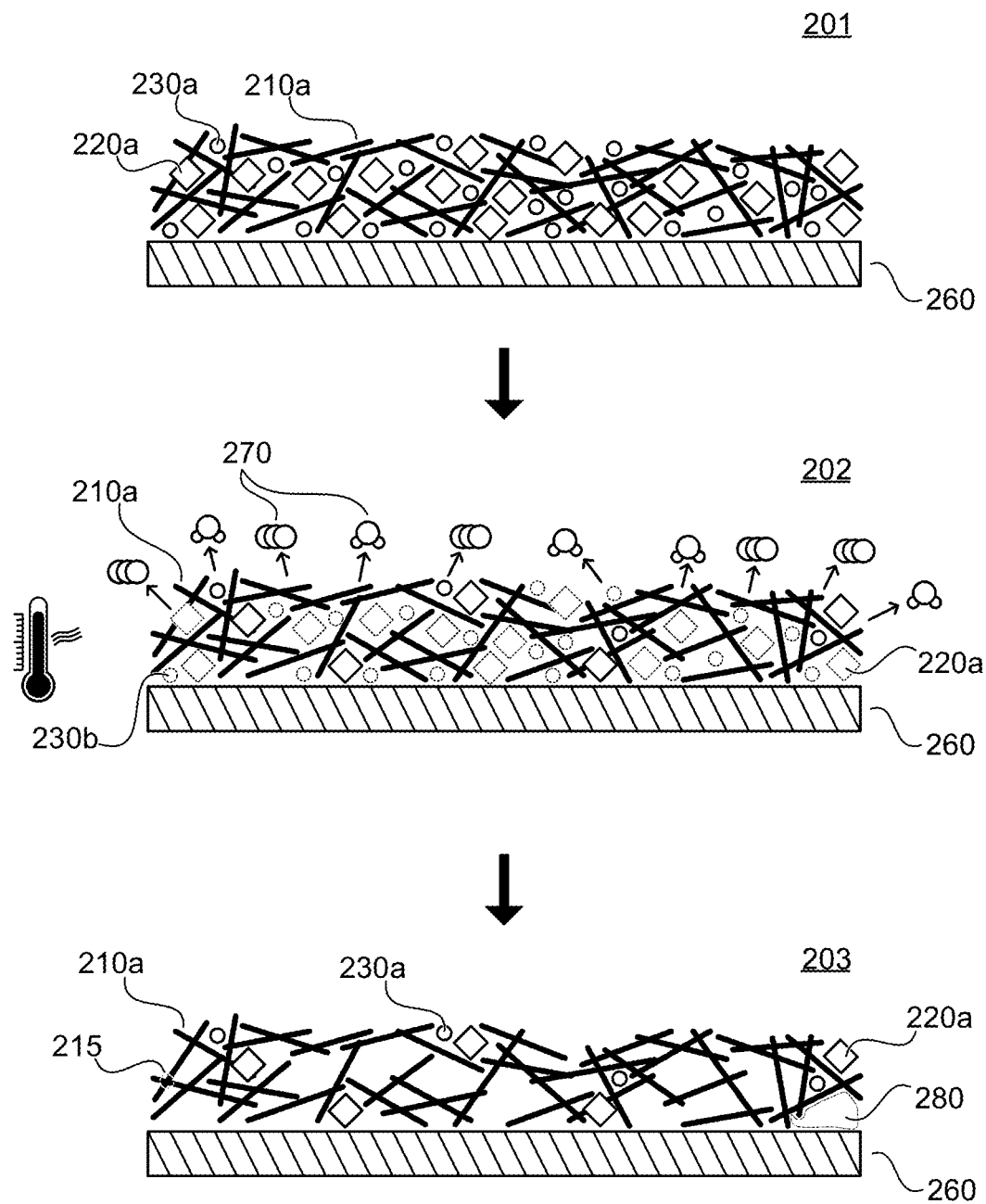
FIG. 2B is a series of illustrations detailing the process steps of rendering a porous nanotube fabric from a porogen-loaded nanotube fabric formed using the first type of porogen-loaded nanotube application solution depicted in FIG. 2A.
Figure 3:
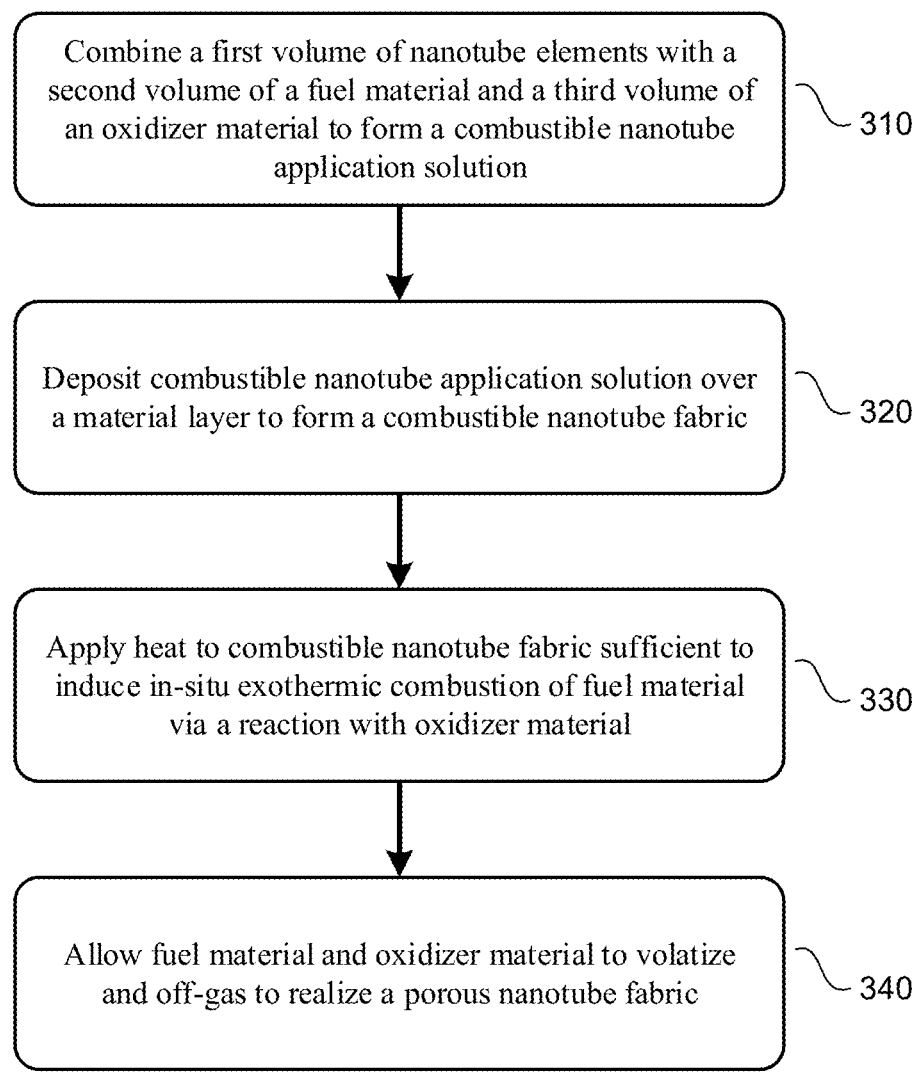
FIG. 3 is a flow chart describing a first method of forming a porous nanotube fabric as depicted in FIGS. 2A and 2B.

FIGS. 2A, 2B, and 3 illustrate a first method of the present disclosure for making a porous nanotube fabric. This first method first combines a volume of nanotube elements, a volume of porogen fuel material, and a volume of oxidizer material into a liquid medium to form a porogen-loaded nanotube application solution (as shown in FIG. 2A and described in more detail below). This porogen-loaded nanotube application solution is then deposited to form a porogen-loaded nanotube fabric, which can then be heated to volatize the fuel material and oxidizer material in an reaction (as shown in FIG. 2B). This reaction off-gases the fuel material and oxidizer material from the fabric and renders the porogen-loaded nanotube fabric into a porous nanotube fabric. In some applications, the reaction volatizes and off-gases substantially all of the fuel material within the porogen-loaded fabric.

Looking now to FIG. 2A, a first volume 210 of nanotube elements 210a, a second volume 220 of porogen fuel material 220a, and a third volume 230 of oxidizer material 230a is combined together and suspended in a liquid medium 240 to form a porogen-loaded nanotube application solution 250. Within the methods of the present disclosure the liquid medium can be, but is not limited to, an aqueous solution, a sulfuric acid solution, or a nitric acid solution. The fuel material and oxidizer material are selected to be materials that will efficiently react together under the application of heat at a specific temperature and leave behind little or no unreacted material in the final porous fabric. For example, within this first method of the present disclosure, a combination of 2-hydroxypropyl-β-cyclodextrin (used as fuel material 220a) and tetramethyl ammonium nitrate (used as oxidizer material 230a) can be used. As will be discussed with respect to FIG. 2B below, these two materials formed into a porogen-loaded nanotube fabric will react in an in-situ reaction at approximately 300° C. In another example, a combination of a block copolymer (used as fuel material 220a) and ammonium nitrate (used as oxidizer material 230a) can be used. Using the methods of the present disclosure, such a combination would react and volatize at 175° C.-200° C. In another example, a combination of sucrose (used as fuel material 220a) and ammonium nitrate (used as oxidizer material 230a) can be used. Using the methods of the present disclosure, such a combination would react and volatize at 175° C.-200° C.

It should be noted that one class of porogens that is well suited to use with the methods of the present disclosure is block copolymers of poly(ethylene)glycol and poly(propylene glycol). Because these polymers are amphiphilic, they form long-range structures when dried down from solution (i.e., after spin-coating). These larger, three-dimensional structures allow for larger pores to form in the final CNT fabric. The methods of the present disclosure can use both diblock (i.e., one block of each) or triblock (i.e., two blocks of one type, one of the other) copolymers for this purpose. The poly(ethylene)glycol is the hydrophilic block, and the poly(propylene glycol) is the hydrophobic block. Different configurations and relative sizes of each block will result in different structures in the resulting fabric. As such, the selection of a specific copolymer configuration can be used to control the size and dimensions of pores within a porous nanotube fabric formed using the methods of the present disclosure.

FIG. 2B illustrates the process of rendering a porogen-loaded nanotube fabric formed using the porogen-loaded nanotube application solution 250 of FIG. 2A into a porous nanotube fabric. Within first process step 201, the porogen-loaded nanotube application solution 250 of FIG. 2A has been deposited over material layer 260 to form a porogen-loaded nanotube fabric. This porogen-loaded nanotube fabric includes a composite material of intermixed nanotube elements 210a, porogen fuel material 220a, and oxidizer material 230a. In a next process step 202, heat is applied to the porogen-loaded nanotube fabric (for example, by baking a wafer on which the nanotube fabric is formed in a thermal oven at a selected temperature). This application of heat induces the fuel material 220a to react with the oxidizer material 220b in an reaction, volatizing both the fuel material and oxidizer material (represented by dashed symbols 220b and 230c, respectively). The reacted material is allowed to off-gas 270, removing the material from the fabric. In final process step 203, most of the fuel material 220a and oxidizer material 230a has been volatilized and off-gassed, leaving behind pores 280 distributed throughout the fabric. In this way, this first method of the present disclosure provides a porous nanotube fabric with a low density of both switching junctions and nanotube elements as compared to a non-porous nanotube fabric.

It should be noted that in certain applications it will be advantageous for the porous nanotube fabric as formed by the methods of the present disclosure to be substantially free of both fuel material. In these applications, residual fuel material may react and volatize at a later stage in the fabrication process, for example, at which time such a reaction may be undesirable (after another material layer has been deposited over said porous nanotube fabric, for example). As such, within these certain applications the types, volumes, and concentrations of the fuel and oxidizer material as well as the ambient temperature used to induce the reaction are carefully selected such that essentially all of the fuel oxidizer material participates in the volatilization, and the porous fabric is substantially free of fuel material. Additionally, within certain applications, an additional anneal step that, for example, bakes the porous fabric at a high temperature (e.g., 375° C. or 400° C.) in an inert atmosphere for a significant time interval (e.g., 3 or 4 hours) can be used following any of the four methods detailed in FIGS. 3, 5, 7, and 9 to ensure any remaining fuel material is volatized. Within certain aspects of the present disclosure, substantially free can mean quantities that are minute but nevertheless measurable such as said quantities cannot react in a meaningful way. In other aspects of the present disclosure, substantially free can mean less than on the order of 0.1% by volume, 0.01% by volume, 0.001% by volume, or 0.0001% by volume. The specific parameters that define a porous fabric being substantially free of residual fuel will be dependent on the needs of a particular application and generally mean that a porous fabric contains such material in volumes below that required to react in such a way as to disturb, damage, or otherwise adversely affect the porous nanotube fabric or any material layer in proximity to the porous nanotube fabric.

FIG. 3 is a flow chart detailing the first method according to the present disclosure of forming a porous nanotube fabric, as illustrated in FIGS. 2A and 2B above. In a first process step 310, a first volume of nanotube elements is combined with a second volume of porogen fuel material and a third volume of oxidizer material. As described above with respect to FIG. 2A, this combination forms a porogen-loaded nanotube application solution. In a next process step 320, the porogen-loaded nanotube application solution is deposited over a material layer to form a porogen-loaded nanotube fabric, as shown in process step 201 in FIG. 2B. In a next process step 330, heat is applied to the porogen-loaded nanotube fabric sufficient to induce an in-situ reaction of the fuel material with the oxidizer material. In final process step 340, this in-situ reaction allows the fuel material and oxidizer material to off-gas, leaving behind voids in the nanotube fabric. Process steps 330 and 340 are illustrated within process step 202 of FIG. 2B. As described above, in certain applications, the in-situ reaction volatizes substantially all of the fuel material. In this way, this first method of the present disclosure is used to form a porous nanotube fabric.

Figure 4A:
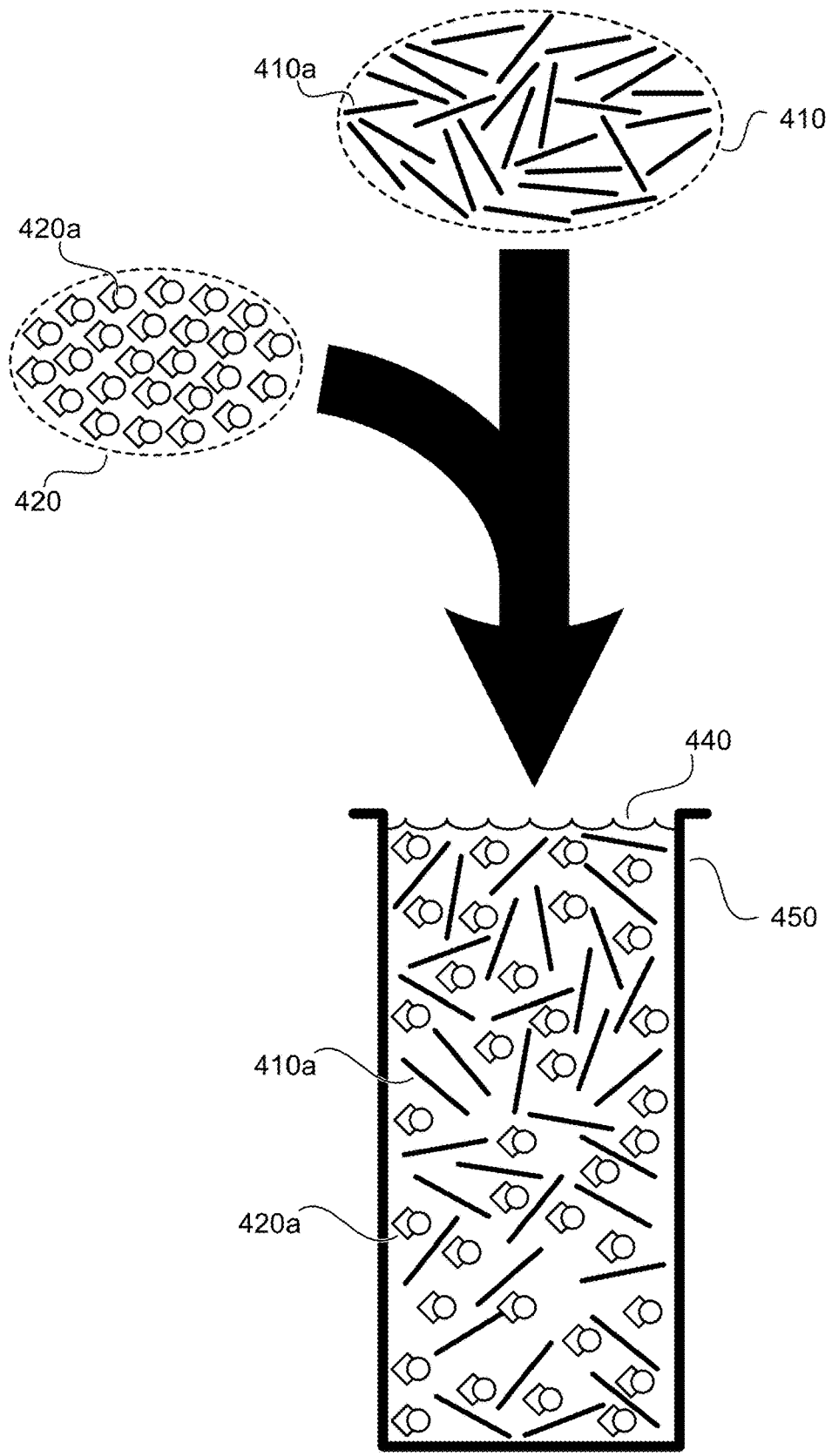
FIG. 4A is a diagram illustrating a second type of porogen-loaded nanotube application solution that includes a fuel material comprising a two-part molecule according to the methods of the present disclosure.
Figure 4B:
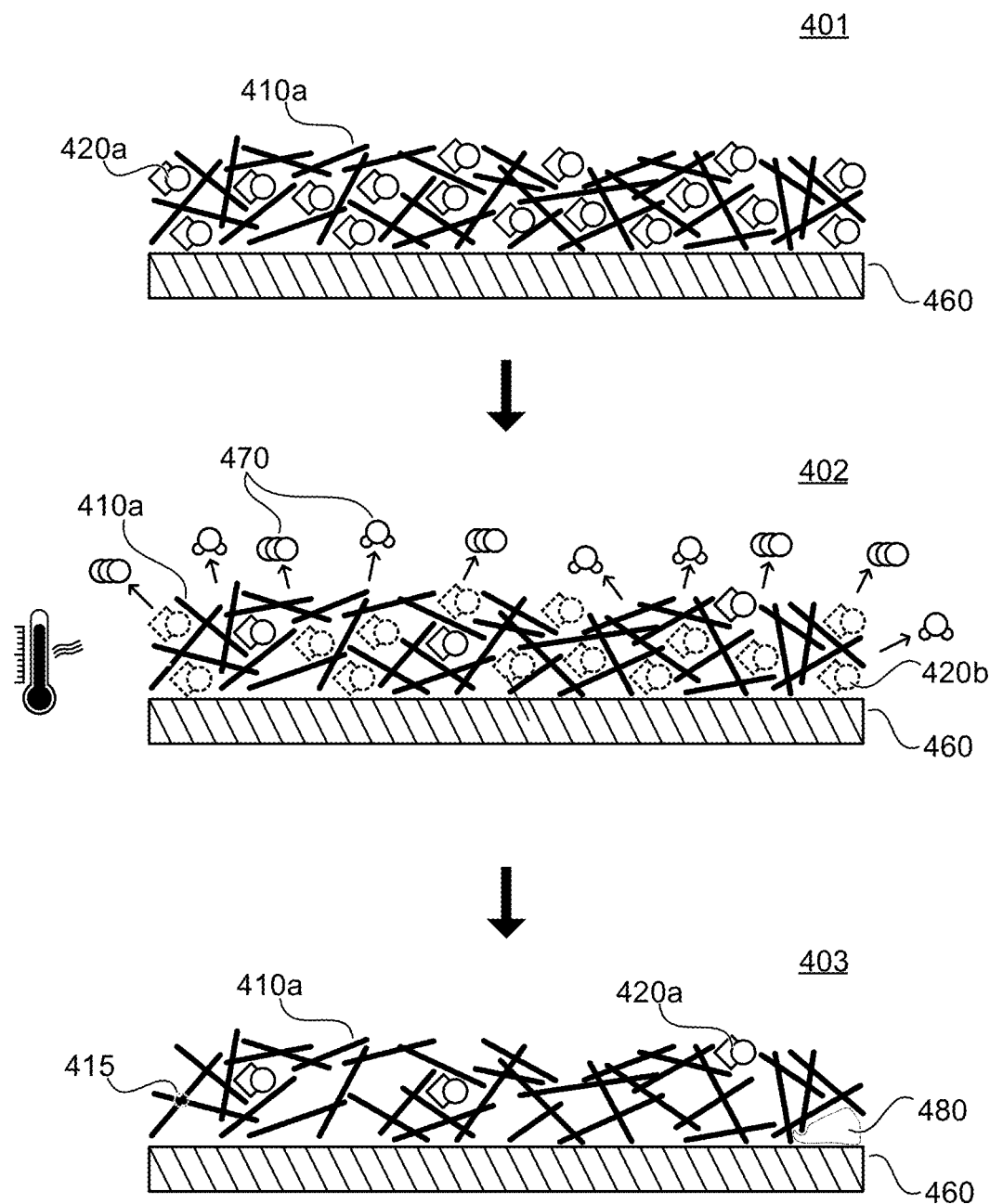
FIG. 4B is a series of illustrations detailing the process steps of rendering a porous nanotube fabric from a porogen-loaded nanotube fabric formed using the second type of porogen-loaded nanotube application solution depicted in FIG. 4A.
Figure 5:
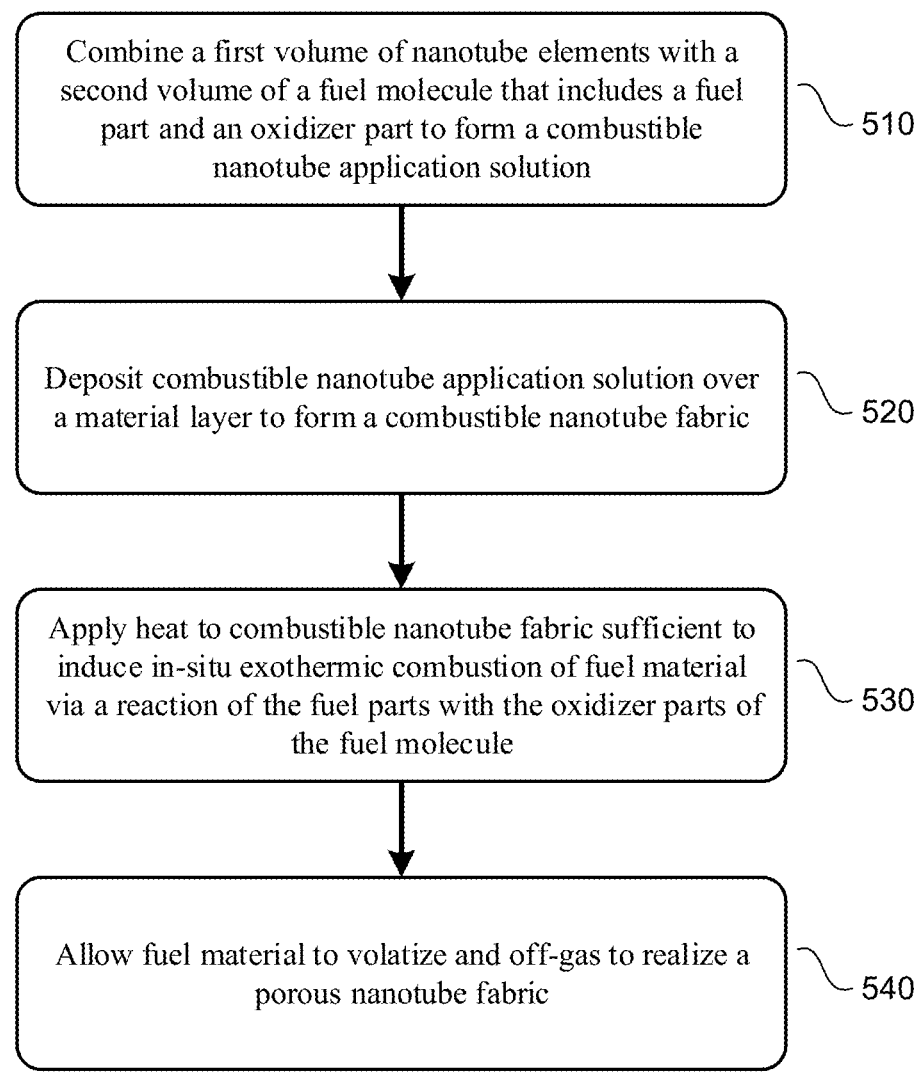
FIG. 5 is a flow chart describing a second method of forming a porous nanotube fabric as depicted in FIGS. 4A and 4B.

FIGS. 4A, 4B, and 5 illustrate a second method of the present disclosure for forming a porous nanotube fabric. This second method uses a porogen fuel material that is comprised of a two-part molecule, wherein the molecule includes a fuel part and an oxidizer part. A volume of nanotube elements is combined with a volume of this two-part fuel material into a liquid medium to form a porogen-loaded nanotube application solution (as shown in FIG. 4A and described in more detail below). As with the first method of the present disclosure (discussed with respect to FIGS. 2A, 2B, and 3 above), this porogen-loaded nanotube application solution is then deposited to form a porogen-loaded nanotube fabric, which can then be heated such that the two molecular parts of the fuel material react to volatize the fuel material in an reaction (as shown in FIG. 4B). This reaction off-gases the fuel material from the fabric and renders the porogen-loaded nanotube fabric into a porous nanotube fabric. In some applications, the reaction volatizes and off-gases substantially all of the fuel material within the porogen-loaded fabric.

Looking now to FIG. 4A, a first volume 410 of nanotube elements 410a and a second volume 420 of two-part fuel material 420a is combined together and suspended in a liquid medium 440 to form a porogen-loaded nanotube application solution 450. Within the methods of the present disclosure the liquid medium can be, but is not limited to, an aqueous solution, a sulfuric acid solution, or a nitric acid solution. The two-part fuel material is selected to be a material with a molecular structure that includes a fuel part and an oxidizer part. Under the application of heat at a specific temperature, the fuel part and the oxidizer part react together in an in-situ reaction, which volatizes the two-part fuel material, providing a porous nanotube fabric. For example, within this second method of the present disclosure, an organic peroxide (such as, but not limited to, benzoyl peroxide) or ethylhydrazine oxalate can be used. When used within this method of the present disclosure, such material would volatize at 200° C.

FIG. 4B illustrates the process of rendering a porogen-loaded nanotube fabric formed using the porogen-loaded nanotube application solution 450 of FIG. 4A into a porous nanotube fabric. Within first process step 401, the porogen-loaded nanotube application solution 450 of FIG. 4A has been deposited over material layer 460 to form a porogen-loaded nanotube fabric. This porogen-loaded nanotube fabric includes a composite material of intermixed nanotube elements 210a and two-part fuel material 420a. In next process step 402, heat is applied to the porogen-loaded nanotube fabric (for example, by baking a wafer on which the nanotube fabric is formed in a thermal oven at a selected temperature). This application of heat induces the two-part fuel material 420a to react in an reaction (the fuel molecular part reacting with the oxidizer molecular part), volatizing the fuel material (represented by dashed symbols 420b). The reacted material is allowed to off-gas 470, removing the material from the fabric. In final process step 403, most of the two-part fuel material 420a has been volatilized and off-gassed, leaving behind pores 480 distributed throughout the fabric. As described above, within certain applications, essentially all of the two-part fuel material reacts and is off-gassed within process step 402, providing a porous nanotube fabric substantially free of any fuel material. In this way, this second method of the present disclosure provides a porous nanotube fabric with a low density of both switching junctions and nanotube elements as compared to a non-porous nanotube fabric.

FIG. 5 is a flow chart detailing the second method according to the present disclosure of forming a porous nanotube fabric, as illustrated in FIGS. 4A and 4B above. In a first process step 510, a first volume of nanotube elements is combined with a second volume of two-part porogen fuel material, the two-part fuel material having a molecular structure that includes a fuel part and an oxidizer part. As described above with respect to FIG. 4A, this combination forms a porogen-loaded nanotube application solution. In a next process step 520, the porogen-loaded nanotube application solution is deposited over a material layer to form a porogen-loaded nanotube fabric, as shown in process step 401 in FIG. 4B. In a next process step 530, heat is applied to the porogen-loaded nanotube fabric sufficient to induce an in-situ reaction of the two parts of the fuel material (the fuel molecular part reacting with the oxidizer molecular part). In final process step 540, this in-situ reaction allows the two-part fuel material to off-gas, leaving behind voids in the nanotube fabric. Process steps 530 and 540 are illustrated within process step 402 of FIG. 4B. As described above, in certain applications, the in-situ reaction volatizes substantially all of the two-part fuel material. In this way, this second method of the present disclosure is used to form a porous nanotube fabric.

Figure 6A:
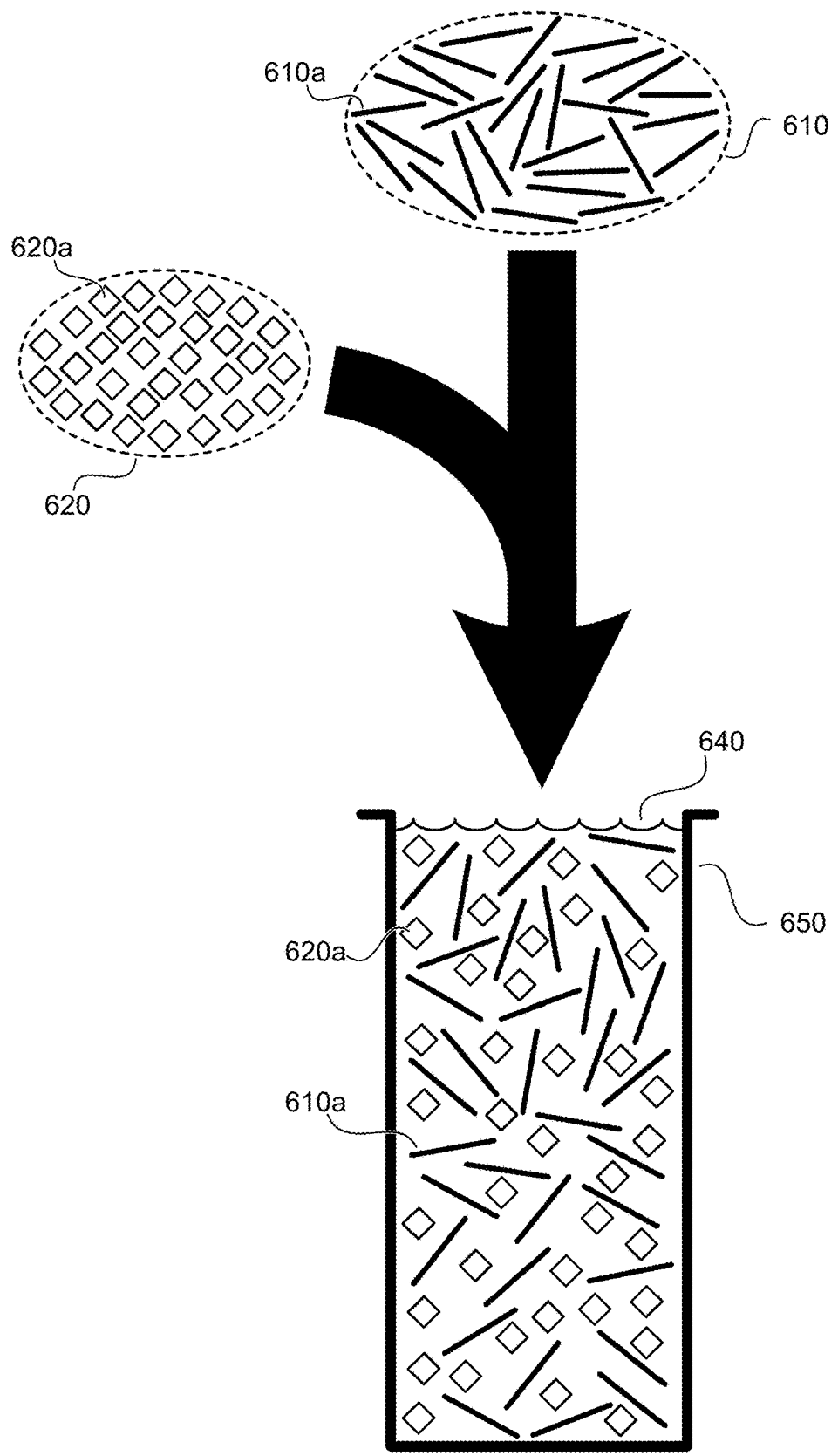
FIG. 6A is a diagram illustrating a first third of porogen-loaded nanotube application solution that includes only fuel material according to the methods of the present disclosure.
Figure 6B:
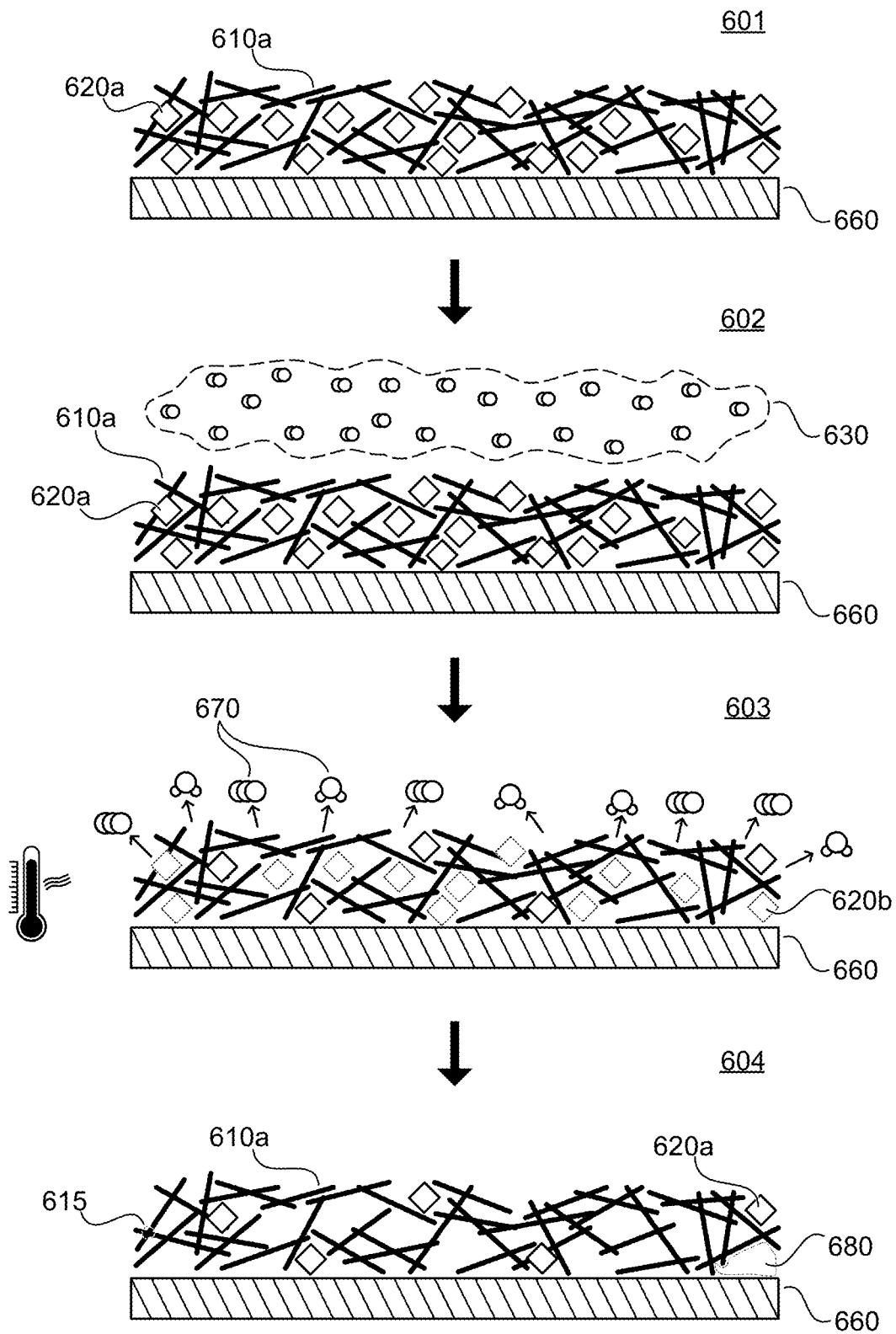
FIG. 6B is a series of illustrations detailing the process steps of rendering a porous nanotube fabric from a porogen-loaded nanotube fabric formed using the third type of porogen-loaded nanotube application solution depicted in FIG. 6A.
Figure 7:
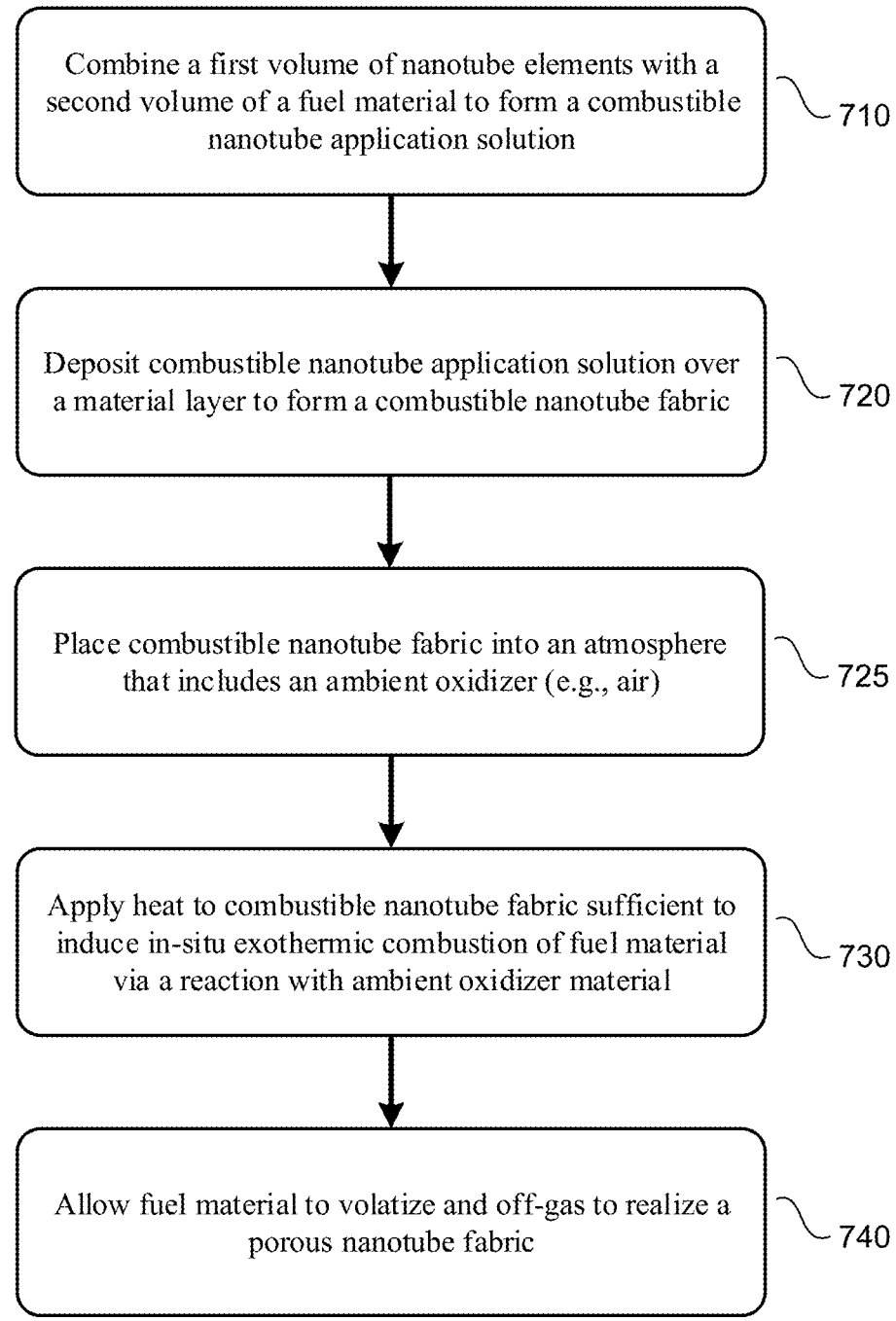
FIG. 7 is a flow chart describing a third method of forming a porous nanotube fabric as depicted in FIGS. 6A and 6B.

FIGS. 6A, 6B, and 7 illustrate a third method of the present disclosure for forming a porous nanotube fabric. This third method first combines a volume of nanotube elements and a volume of porogen fuel material into a liquid medium to form a porogen-loaded nanotube application solution (as shown in FIG. 6A and described in more detail below). This porogen-loaded nanotube application solution is then deposited to form a porogen-loaded nanotube fabric, which can then be placed into an environment with an ambient oxidizer and heated. Under heat, the fuel material within the porogen-loaded nanotube fabric reacts with the ambient oxidizer material in an reaction (as shown in FIG. 6B). This reaction off-gases the fuel material from the fabric and renders the porogen-loaded nanotube fabric into a porous nanotube fabric. In some applications, the reaction volatizes and off-gases substantially all of the fuel material within the fabric.

Looking now to FIG. 6A, a first volume 610 of nanotube elements 610*a* and a second volume 620 of porogen fuel material 620*a* is combined together and suspended in a liquid medium 640 to form a porogen-loaded nanotube application solution 650. Within the methods of the present disclosure the liquid medium can be, but is not limited to, an aqueous solution, a sulfuric acid solution, or a nitric acid solution. Unlike the first porous fabric formation method detailed in FIGS. 2A, 2B, and 3 (discussed in detail above), porogen-loaded nanotube application solution 650 does not include any oxidizer material. Instead, as will be shown in FIG. 6B below, this third method of the present disclosure uses porogen-loaded nanotube application solution 650 to form a porogen-loaded nanotube fabric, which is then placed into an environment with an ambient oxidizer (630 in FIG. 6B) and heated.

Looking now to FIG. 6B, a series of diagrams illustrates the process of rendering a porogen-loaded nanotube fabric formed using the porogen-loaded nanotube application solution 650 of FIG. 6A into a porous nanotube fabric. Within first process step 601, the porogen-loaded nanotube application solution 650 of FIG. 6A has been deposited over material layer 660 to form a porogen-loaded nanotube fabric. This porogen-loaded nanotube fabric includes a composite material of intermixed nanotube elements 610*a* and porogen fuel material 620*a*. In a next process step 602, the porogen-loaded nanotube fabric is placed into an environment that includes ambient oxidizer 630. In next process step 603, heat is applied to the porogen-loaded nanotube fabric (for example, by baking a wafer on which the nanotube fabric is formed in a thermal oven at a selected temperature). This application of heat induces the fuel material 620*a* to react with the ambient oxidizer material 630, volatizing the fuel material within the porogen-loaded nanotube fabric (represented by dashed symbols 620*b*). The reacted material is allowed to off-gas 670, removing the material from the fabric. In final process step 604, most of the fuel material 620*a* has been volatilized and off-gassed, leaving behind pores 680 distributed throughout the fabric. As described above, within certain applications, essentially all of the fuel material reacts and is off-gassed within process step 603, providing a porous nanotube fabric substantially free of any fuel material. In this way, this third method of the present disclosure provides a porous nanotube fabric with a low density of both switching junctions and nanotube elements as compared to a non-porous nanotube fabric.

Within this third method of the present disclosure, the porogen fuel material (620 in FIG. 6A) and ambient oxidizer (630 in FIG. 6B) are selected to be materials that will efficiently react together under the application of heat at a specific temperature and leave behind little or no unreacted material in the final porous fabric. For example, a block copolymer (used as fuel material 620) could be used within a standard air environment of approximately 21% oxygen (the ambient oxygen serving as the ambient oxidizer material 630). Using the process described with respect to FIG. 6B above, these two materials will react under applied heat in an in-situ reaction at 250° C. to render a porous nanotube fabric. In another example, within this third method of the present disclosure, a block copolymer (used as fuel material 620) could be used within a gaseous environment that was a mixture of air and ammonium nitrate (the ambient ammonium nitrate serving as the ambient oxidizer material 630). Using the process described with respect to FIG. 6B above, these two materials will react under applied heat at 200° C. to render a porous nanotube fabric. In another example, within this third method of the present disclosure, a sugar (such as, but not limited to, sucrose) could be used within a standard air environment of approximately 21% oxygen (the ambient oxygen serving as the ambient oxidizer material 630). Using the process described with respect to FIG. 6B above, these two materials will react under applied heat in an in-situ reaction at 250° C. to render a porous nanotube fabric FIG. 7 is a flow chart detailing the third method according to the present disclosure of forming a porous nanotube fabric, as illustrated in FIGS. 6A and 6B above. In a first process step 710, a first volume of nanotube elements is combined with a second volume of porogen fuel material. As described above with respect to FIG. 6A, this combination forms a porogen-loaded nanotube application solution. In a next process step 720, the porogen-loaded nanotube application solution is deposited over a material layer to form a porogen-loaded nanotube fabric, as shown in process step 601 in FIG. 6B. In a next process step 725, the porogen-loaded nanotube fabric is placed into an environment that includes an ambient oxidizer (e.g., a 21% oxygen environment), as shown in process step 602 in FIG. 6B. In a next process step 730, heat is applied to the porogen-loaded nanotube fabric sufficient to induce an in-situ reaction of the fuel material with the ambient oxidizer. In final process step 740, this in-situ reaction allows the fuel material and oxidizer material to off-gas, leaving behind voids in the nanotube fabric. Process steps 730 and 740 are illustrated within process step 602 of FIG. 6B. As described above, in certain applications, the in-situ reaction volatates substantially all of the fuel material. In this way, this third method of the present disclosure is used to form a porous nanotube fabric.

Figure 8A:
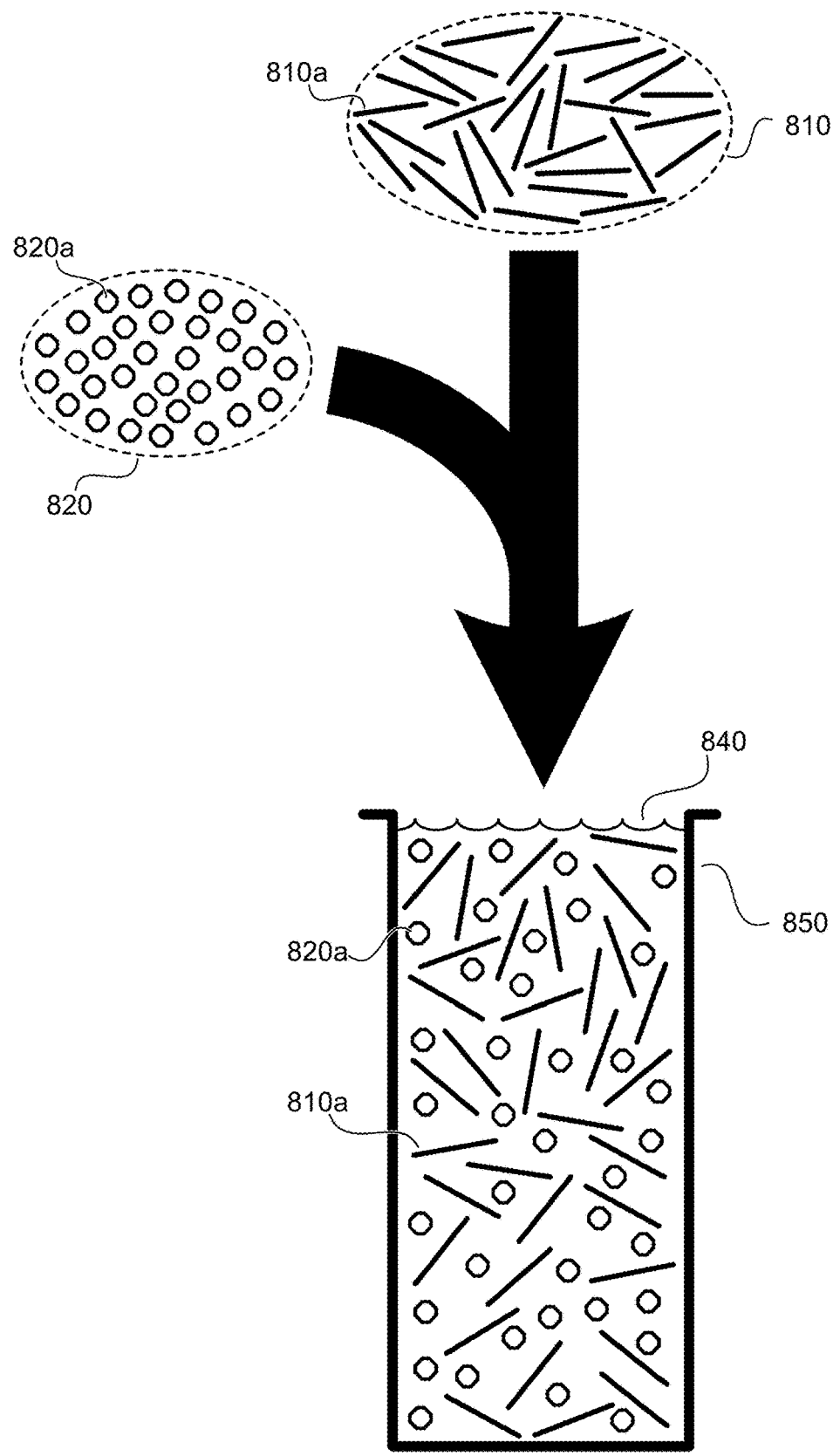
FIG. 8A is a diagram illustrating a first type of porogen-loaded nanotube application solution that includes a fuel material that will thermally decompose under applied heat according to the methods of the present disclosure.
Figure 8B:
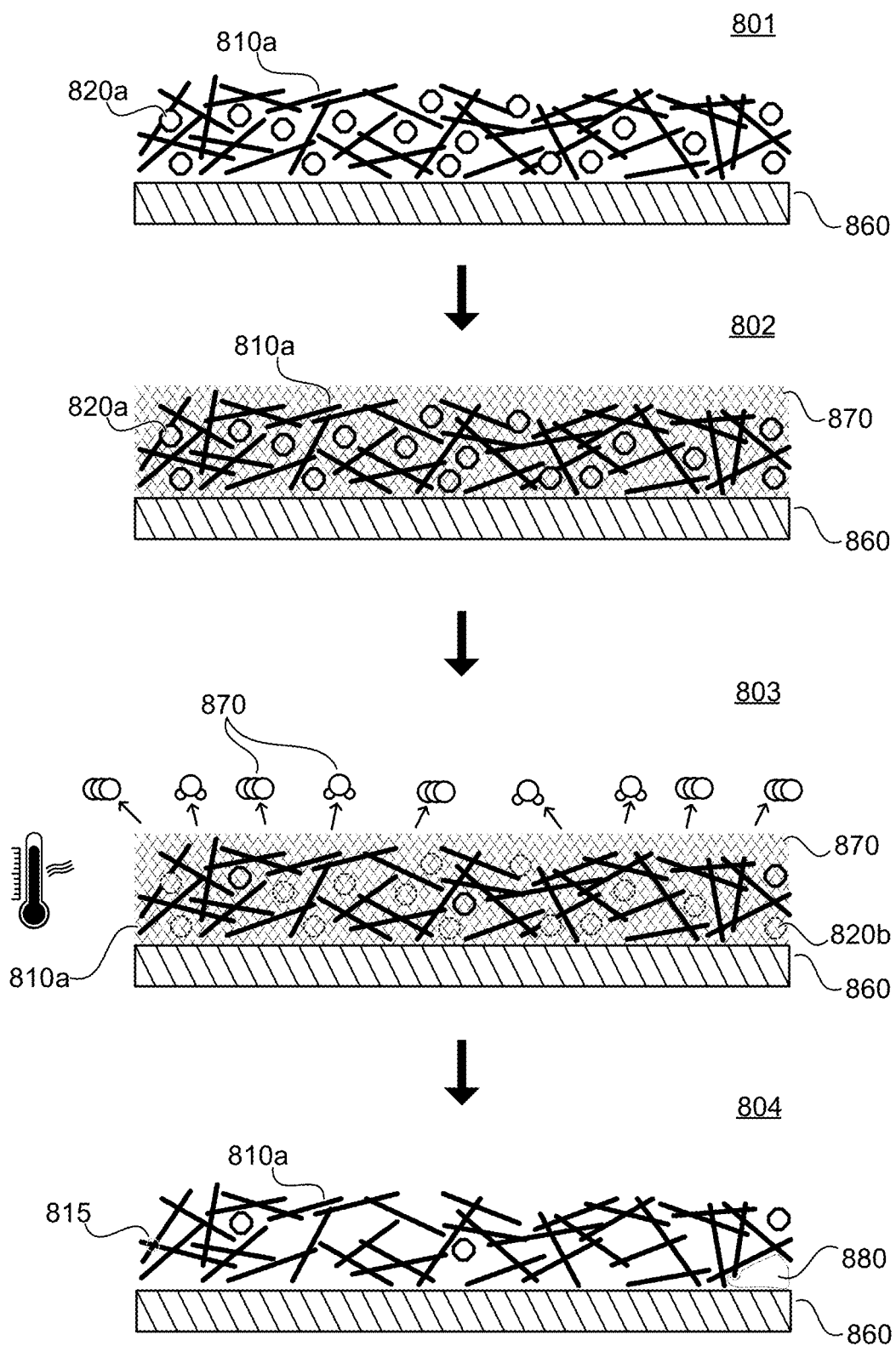
FIG. 8B is a series of illustrations detailing the process steps of rendering a porous nanotube fabric from a porogen-loaded nanotube fabric formed using the fourth type of porogen-loaded nanotube application solution depicted in FIG. 8A.
Figure 9:
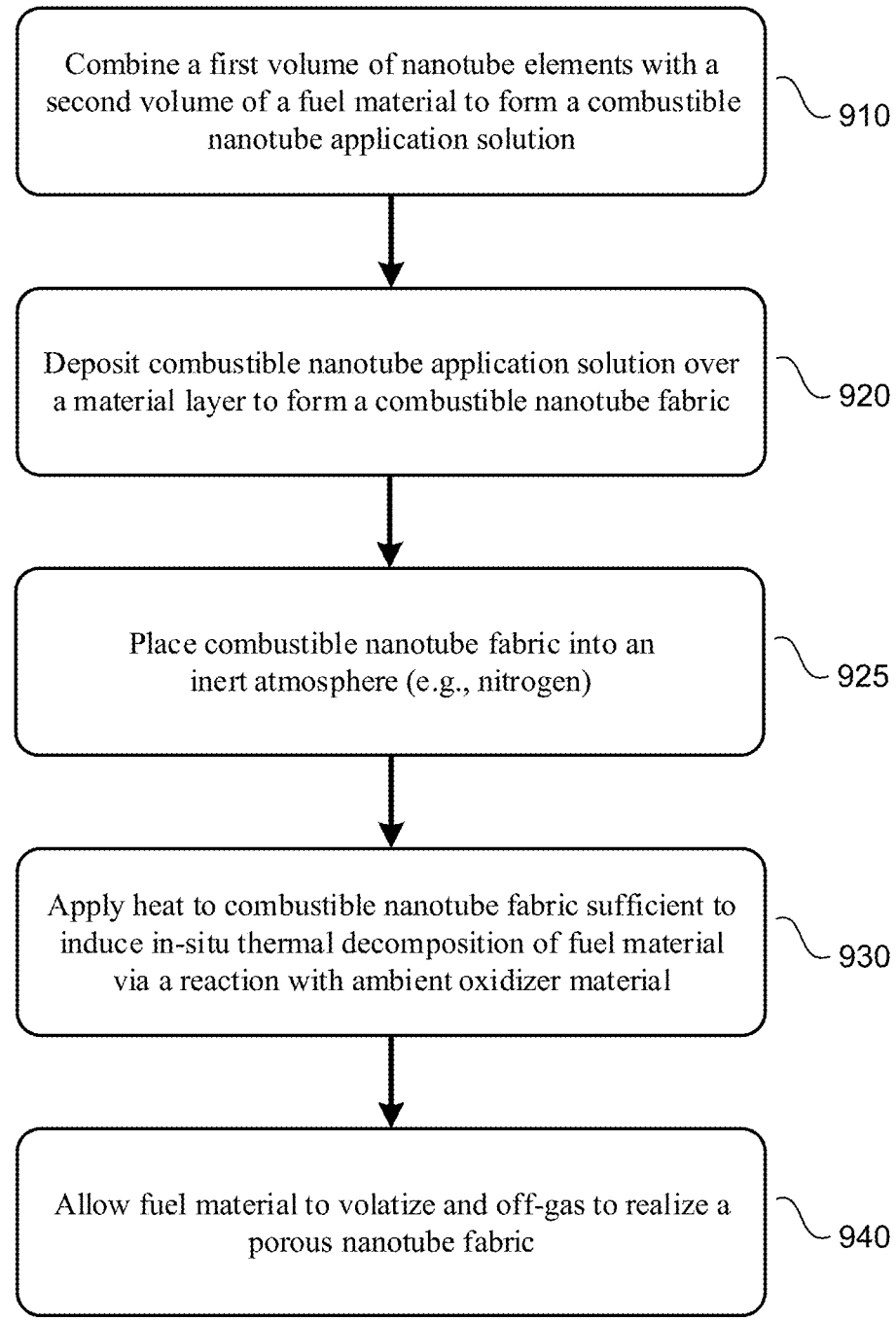
FIG. 9 is a flow chart describing a fourth method of forming a porous nanotube fabric as depicted in FIGS. 8A and 8B.

FIGS. 8A, 8B, and 9 illustrate a fourth method of the present disclosure for forming a porous nanotube fabric. This fourth method first combines a volume of nanotube elements and a volume of thermally decomposable fuel material into a liquid medium to form a porogen-loaded nanotube application solution (as shown in FIG. 8A and described in more detail below). This porogen-loaded nanotube application solution is then deposited to form a porogen-loaded nanotube fabric. Under applied heat, the thermally decomposable fuel material within the porogen-loaded nanotube fabric volatizes and off-gases (as shown in FIG. 8B). This volatilization of the fuel material from the fabric renders the porogen-loaded nanotube fabric into a porous nanotube fabric. In some applications, the thermal decomposition volatizes and off-gases substantially all of the fuel material within the fabric. Unlike the previous three methods of the present disclosure discussed above, the fuel material used within this fourth method thermally decomposes under applied heat, even in the absence of an oxidizer. As such, the fourth method of the present disclosure is well-suited for use within inert environments (such as, but not limited to, nitrogen).

Looking now to FIG. 8A, a first volume 810 of nanotube elements 810a, a second volume 820 of thermally decomposable fuel material 820a is combined together and suspended in a liquid medium 840 to form a porogen-loaded nanotube application solution 850. Within the methods of the present disclosure the liquid medium can be, but is not limited to, an aqueous solution, a sulfuric acid solution, or a nitric acid solution. As described above, the thermally decomposable fuel material 820a is a material that will volatize under applied heat even in the absence of an oxidizer. For example, Poloxamer 407 (a block copolymer porogen material), when used as fuel material within a porogen-loaded nanotube fabric according to this fourth method of the present disclosure, will thermally decompose at 400° C. in an inert nitrogen atmosphere. In another example, a sugar (such as, but not limited to sucrose) could be used as a fuel material, or polyvinyl alcohol could be used as a fuel material. When used with this fourth method of the present disclosure, both of these materials volatize at approximately 400° C.

Looking now to FIG. 8B, a series of diagrams illustrates the process of rendering a porogen-loaded nanotube fabric formed using the porogen-loaded nanotube application solution 850 of FIG. 8A into a porous nanotube fabric. Within first process step 801, the porogen-loaded nanotube application solution 850 of FIG. 8A has been deposited over material layer 860 to form a porogen-loaded nanotube fabric. This porogen-loaded nanotube fabric includes a composite material of intermixed nanotube elements 810a and thermally decomposable fuel material 820a. In a next process step 802, the porogen-loaded nanotube fabric is placed into an inert environment (such as, but not limited to, a nitrogen atmosphere). In next process step 803, heat is applied to the porogen-loaded nanotube fabric (for example, by baking a wafer on which the nanotube fabric is formed in a thermal oven at a selected temperature). This application of heat induces the thermally decomposable fuel material 820a to volatize within the porogen-loaded nanotube fabric (represented by dashed symbols 820b). The reacted material is allowed to off-gas 870, removing the material from the fabric. In final process step 804, most of the fuel material 820a has been volatilized and off-gassed, leaving behind pores 880 distributed throughout the fabric. As described above, within certain applications, essentially all of the fuel material reacts and is off-gassed within process step 803, providing a porous nanotube fabric substantially free of any fuel material. In this way, this fourth method of the present disclosure provides a porous nanotube fabric with a low density of both switching junctions and nanotube elements as compared to a non-porous nanotube fabric.

FIG. 9 is a flow chart detailing the fourth method according to the present disclosure of forming a porous nanotube fabric, as illustrated in FIGS. 8A and 8B above. In a first process step 910, a first volume of nanotube elements is combined with a second volume of thermally decomposable fuel material. As described above with respect to FIG. 8A, this combination forms a porogen-loaded nanotube application solution. In a next process step 920, the porogen-loaded nanotube application solution is deposited over a material layer to form a porogen-loaded nanotube fabric, as shown in process step 801 in FIG. 8B. In a next process step 925, the porogen-loaded nanotube fabric is placed into an inert atmosphere (such as, but not limited to, a nitrogen atmosphere), as shown in process step 802 in FIG. 8B. In a next process step 930, heat is applied to the porogen-loaded nanotube fabric sufficient to induce in-situ thermal decomposition of the fuel material. In final process step 940, this in-situ thermal decomposition allows the fuel material and oxidizer material to off-gas, leaving behind voids in the nanotube fabric. Process steps 930 and 940 are illustrated within process step 802 of FIG. 8B. As described above, in certain applications, the in-situ thermal decomposition volatizes substantially all of the fuel material. In this way, this fourth method of the present disclosure is used to form a porous nanotube fabric.

It should be noted that the use of a thermally decomposable fuel material within this fourth method of the present disclosure is not limited to use within inert environments, and the present disclosure should not be limited in this regard. The inert environment 870 depicted in FIG. 8B and discussed with respect to this fourth porous fabric formation method of the present disclosure is intended only as an exemplary illustration to show that this method is well suited for use in inert environments. Indeed, the methods of the present disclosure could be used such that a porogen-loaded nanotube fabric using a thermally decomposable fuel material (such as, but not limited to, Poloxamer-407) is heated in a non-inert atmosphere, such as to take advantage of both an oxidation reaction and a thermal decomposition of the fuel material at allow for in-situ volatilization at a lower temperature (for example, 300° C.).

Figure 10:
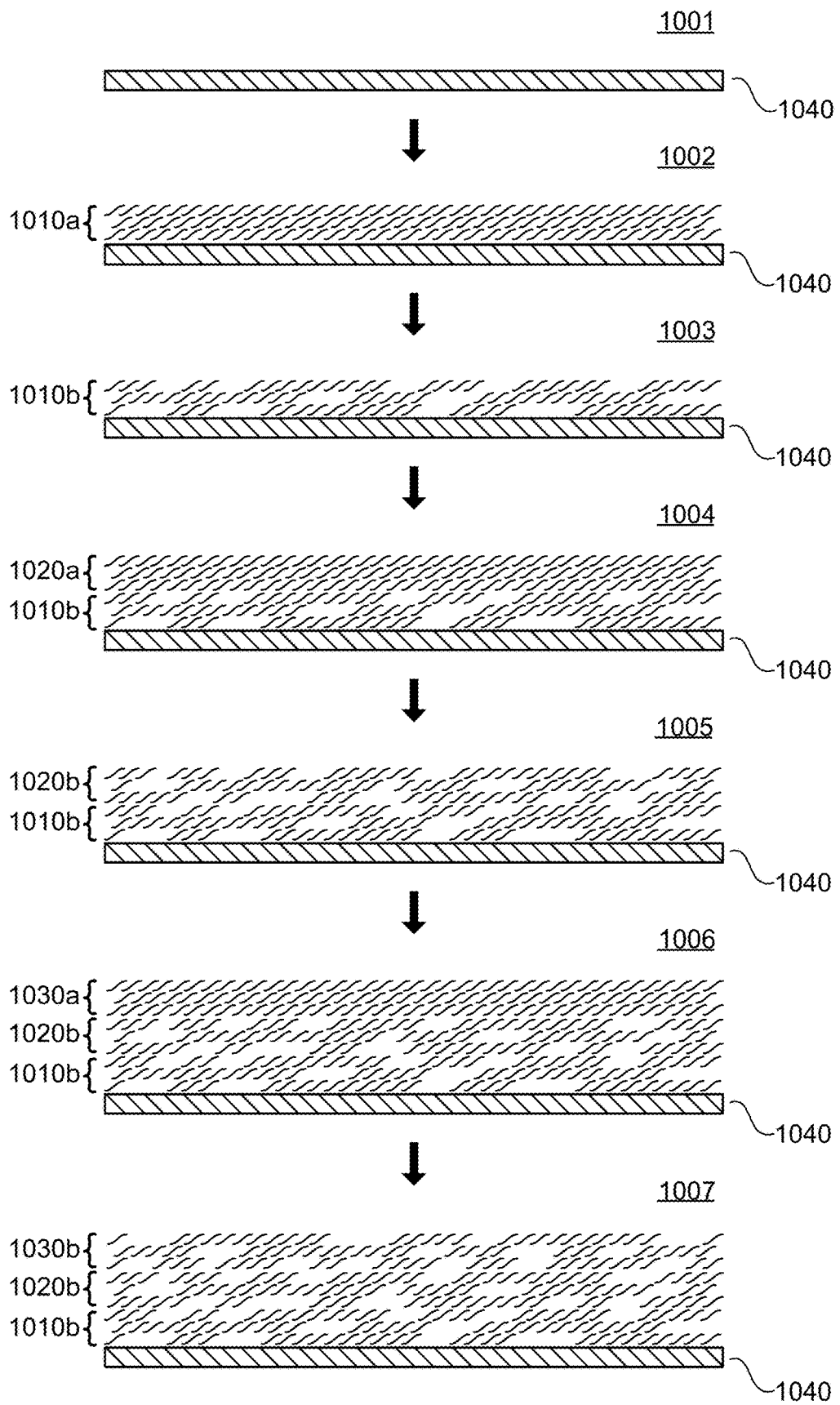
FIG. 10 is a series of illustrations detailing the process steps of forming a multilayer porous nanotube fabric wherein a volatilization process is performed after the formation of each layer.

FIG. 10 is a process diagram illustrating a first exemplary process for forming a multi-layer porous nanotube fabric using the methods of the present disclosure. Within this exemplary process, a porous nanotube fabric is formed using three deposition operations (for example, spin-coating operations) to form the fabric in three layers. Each of these deposition operations deposits a porogen-loaded nanotube application solution according to the methods of the present disclosure (as described above with respect to FIGS. 2A, 4A, and 6A) to form a porogen-loaded nanotube fabric layer. After the deposition of each layer, the methods of the present disclosure (as described above with respect to FIGS. 2B, 4B, and 6B) are used to induce in-situ reaction within the porogen-loaded nanotube fabric layer to render the fabric layer into a porous nanotube fabric layer before next layer is deposited. In this way, the methods of the present disclosure are used to form a multilayer porous nanotube fabric. It should be noted that while the exemplary process of FIG. 10 depicts a three-layer porous nanotube fabric formed using three deposition operations, the methods of the present disclosure are not limited in this regard. The use of three layers within the exemplary process of FIG. 10 is meant only as a non-limiting, illustrative example. Indeed, the methods of the present disclosure can be used within the formation of single layer fabrics or the formation of multilayer fabrics comprising any number of layers.

Looking to FIG. 10, in a first process step 1001, a material layer 1040 is provided. In a next process step 1002, a porogen-loaded nanotube application solution (formed according to one of the methods described with respect to FIGS. 2A, 4A, and 6A above) is deposited to form a first porogen-loaded nanotube fabric layer 1010a. In a next process step 1003, first porogen-loaded nanotube fabric layer 1010a is heated to render first porogen-loaded nanotube fabric layer 1010a into first porous nanotube fabric layer 1010b (according to one of the methods described with respect to FIGS. 2B, 4B, and 6B above). In this way a first layer of the porous nanotube fabric is formed. This process is then repeated to form the second layer with process step 1004, which deposits second porogen-loaded nanotube fabric layer 1020a, and then process step 1005, which renders second porogen-loaded nanotube fabric layer 1020a into second porous nanotube fabric layer 1020b. Finally, the third layer is formed with process step 1006, which deposits third porogen-loaded nanotube fabric layer 1030a, and then process step 1007, which renders third porogen-loaded nanotube fabric layer 1030a into third porous porogen-loaded nanotube fabric layer 1030b. In this way, the methods of the present disclosure are used to deposit a porogen-loaded nanotube application solution in three layers to form a three-layer porous nanotube fabric.

Figure 11:
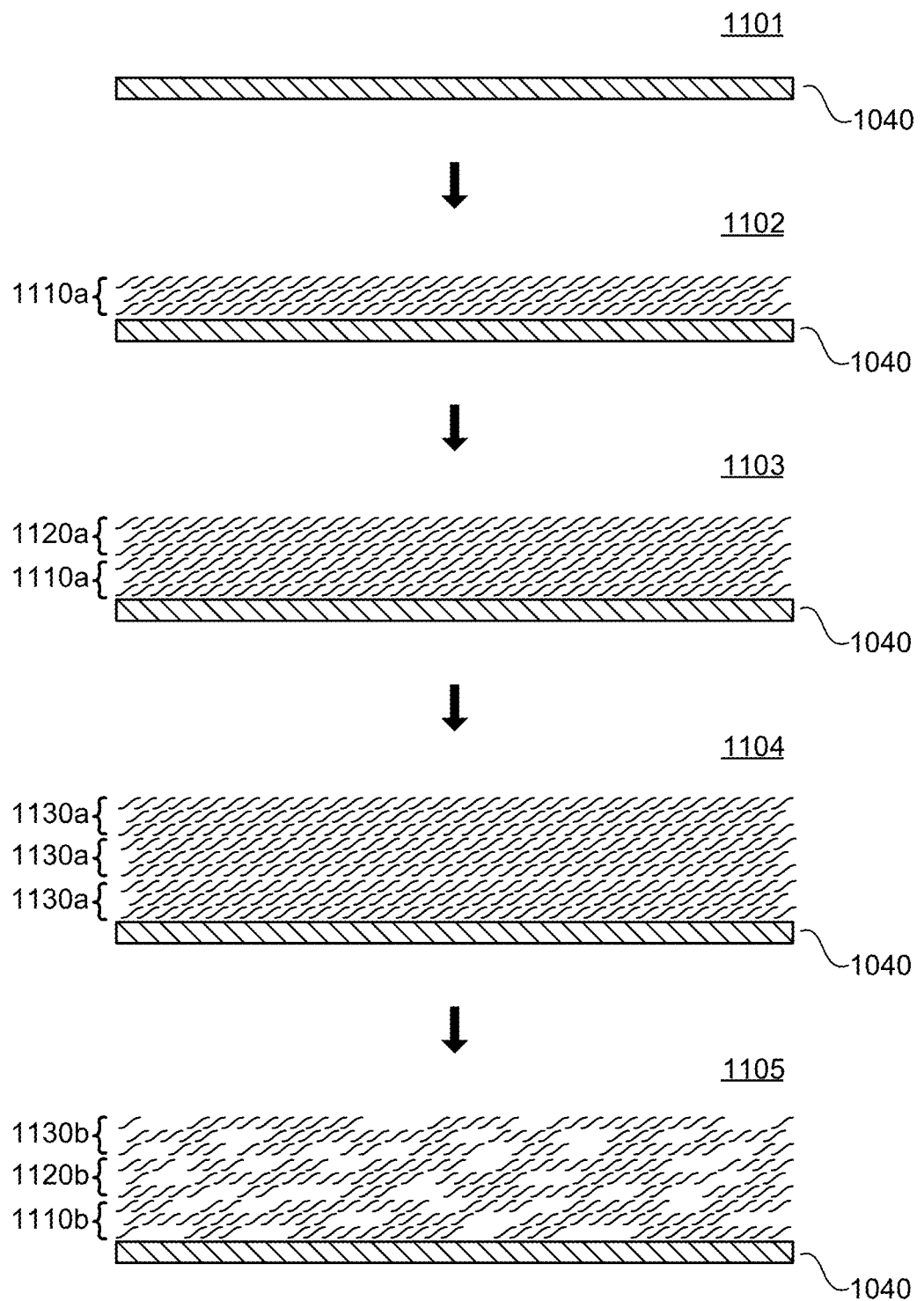
FIG. 11 is a series of illustrations detailing the process steps of forming a multilayer porous nanotube fabric wherein a volatilization is performed after all of the layers have been formed.
Figure 13A:
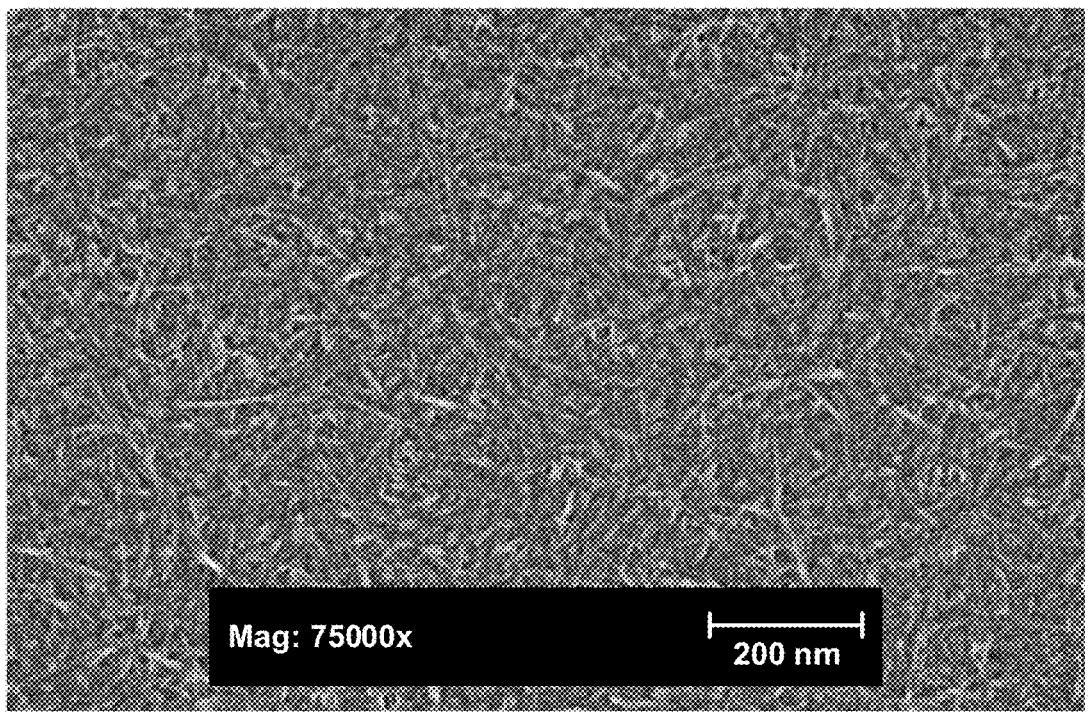
FIG. 13A is an SEM image showing a non-porous fabric used as a control within the first example of the present disclosure.
Figure 13B:
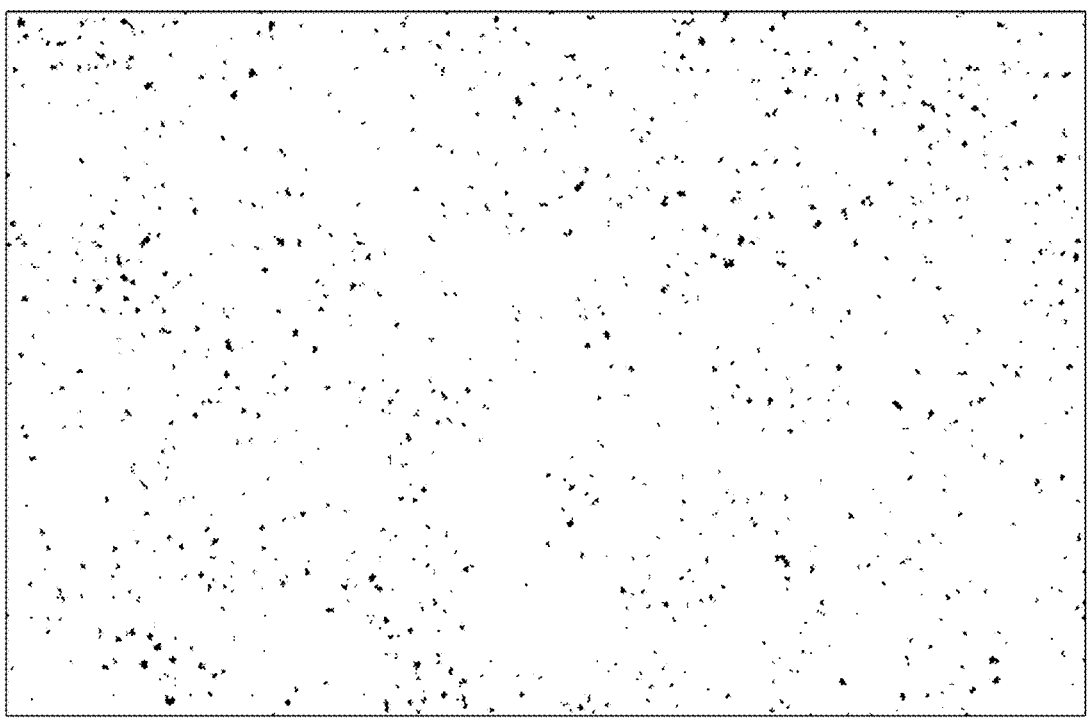
FIG. 13B is a pore image highlighting the pores visible within the non-porous fabric shown in FIG. 13A.
Figure 14A:
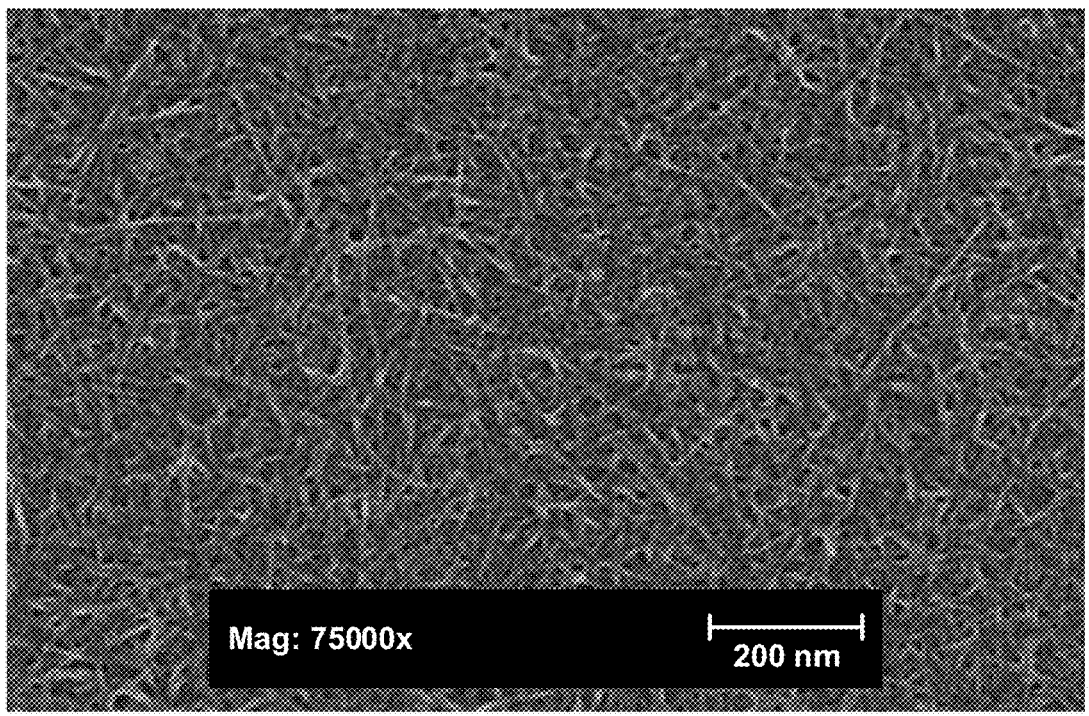
FIG. 14A is an SEM image showing a moderately porous fabric formed within the first example of the present disclosure.
Figure 14B:
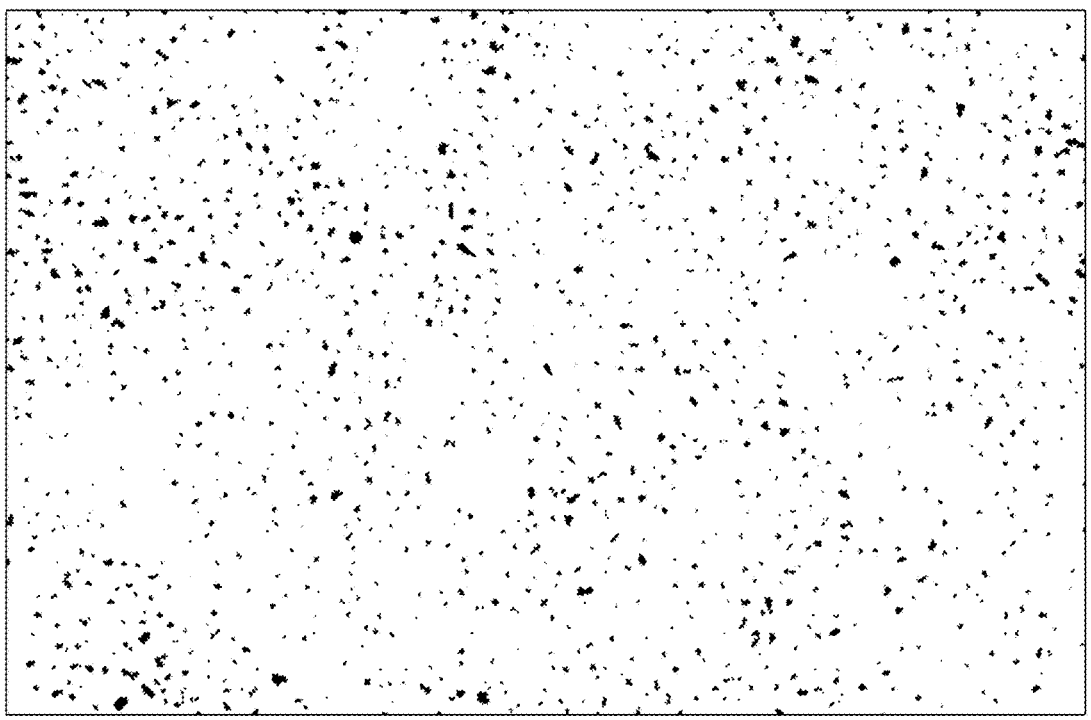
FIG. 14B is a pore image highlighting the pores visible within the moderately porous fabric shown in FIG. 14A.
Figure 15A:
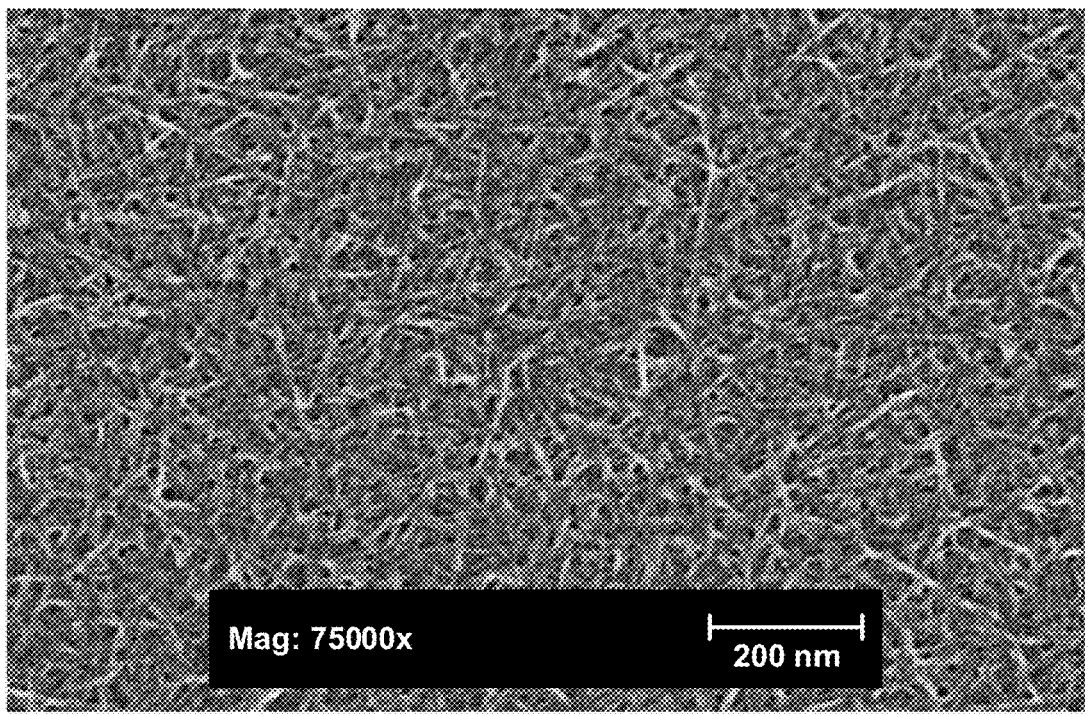
FIG. 15A is an SEM image showing a highly porous fabric formed within the first example of the present disclosure.
Figure 15B:
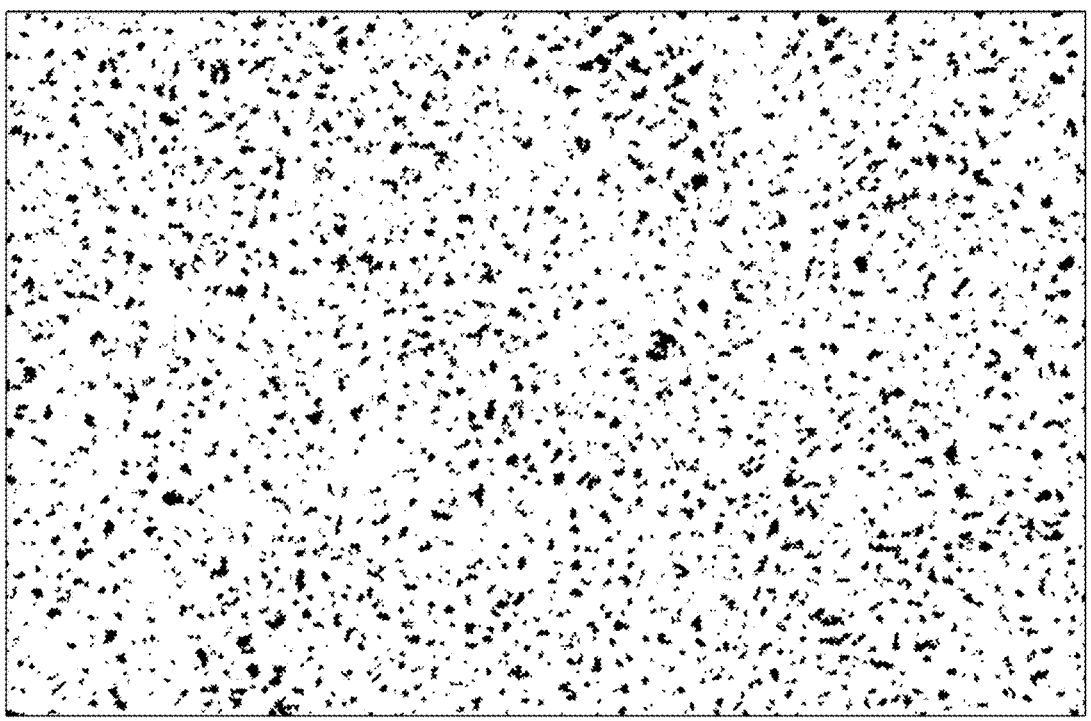
FIG. 15B is a pore image highlighting the pores visible within the highly porous fabric shown in FIG. 15A.

FIG. 11 is a process diagram illustrating a second exemplary process for forming a multi-layer porous nanotube fabric using the methods of the present disclosure. As with the process depicted in FIG. 10, within the exemplary process of FIG. 11, a porous nanotube fabric is formed using three deposition operations (for example, spin-coating operations) to form the fabric in three layers. Each of these deposition operations deposits a porogen-loaded nanotube application solution according to the methods of the present disclosure (as described above with respect to FIGS. 2A, 4A, and 6A) to form a porogen-loaded nanotube fabric layer. However, within the exemplary process of FIG. 11, all three porogen-loaded nanotube fabric layers are formed before the methods of the present disclosure (as described above with respect to FIGS. 2B, 4B, and 6B) are used to induce an in-situ volatilization of the fuel material within the three-layer porogen-loaded nanotube fabric layer and render the fabric into a porous nanotube fabric layer in one step. In this way, the methods of the present disclosure are used to form a multilayer porous nanotube fabric using a single heating operation (e.g., process step 202 in FIG. 2B).

Looking to FIG. 11, in a first process step 1101, a material layer 1140 is provided. In a next process step 1102, a volatilization nanotube application solution (formed according to one of the methods described with respect to FIGS. 2A, 4A, and 6A above) is deposited to form a first volatilization nanotube fabric layer 1110a. This deposition process is then repeated with process step 1103 to form second volatilization nanotube fabric layer 1120a and with process step 1104 to form third volatilization nanotube fabric layer 1130a. After all three volatilization nanotube fabric layers (1110a, 1120a, and 1130a) have been formed, the multilayer volatilization nanotube fabric is heated within process step 1105 to induce an in-situ volatilization and render all three layers porous (according to one of the methods described with respect to FIGS. 2B, 4B, and 6B above) in a single operation. That is, process step 1105 renders first, second, and third porogen-loaded nanotube fabric layers (1110a, 1120a, and 1130a, respectively) into first, second, and third porous nanotube fabric layers (1110b, 1120b, and 1130b, respectively). In this way, the methods of the present disclosure are used to deposit a porogen-loaded nanotube application solution in three layers to form a three-layer porous nanotube fabric.

It should be noted that while the exemplary processes of FIG. 10 and FIG. 11 depict three-layer porous nanotube fabrics each formed using three deposition operations, the methods of the present disclosure are not limited in this regard. The use of three layers within the exemplary processes of FIG. 10 and FIG. 11 is meant only as non-limiting, illustrative examples. Indeed, the methods of the present disclosure can be used within the formation of single layer fabrics or the formation of multilayer fabrics comprising any number of layers.

Example 1

FIGS. 12, 13A, 13B, 14A, 14B, 15A, and 15B provide data and images from three different nanotube fabric samples fabricated to illustrate the methods of the present disclosure as described in detail above. A first sample nanotube fabric (shown in FIGS. 13A and 13B) was formed without using any fuel material to serve as a control sample. A second sample nanotube fabric (shown in FIGS. 14A and 14B) was formed using oxidizer material at a relatively low concentration (86 ppm, 15 ppm as N). And a third sample fabric (shown in FIGS. 15A and 15B) was formed using oxidizer material at a relatively high concentration (285 ppm, 50 ppm as N). Visual analysis tools were used on SEM images of the three fabrics (FIGS. 13A, 14A, and 15A) to generate pore plots for each of the three fabrics (FIGS. 13B, 14B, and 15B), which could then be used to calculate the pore count, the pore size, and the porosity percentage of each of the fabrics. Within this visual analysis, each top-down SEM image (1301, 1401, and 1501 in FIGS. 13A, 14A, and 15A, respectively) was thresholded by the use of the 'Fiji' image processing distribution of ImageJ. First, the image was cropped to remove any text added by the instrument capture. Then, a local contrast enhancement algorithm was applied to the image to reduce long-range intensity gradients. A local threshold algorithm (Sauvola) was then applied to the image, and the resulting thresholded image was despeckled to remove orphan pixels. Finally, pores were counted using the 'Analyze Particles' algorithm. The data from this analysis is summarized in table 1200 of FIG. 12.

All three of the nanotube fabrics within this example were first realized through the following method. Fifty grams of raw (that is, unfunctionalized) carbon nanotubes (CNTs) of the selected type (as discussed above) were refluxed in microelectronics grade nitric acid. Supplies of raw nanotubes may be purchased commercially from a number of vendors (e.g., Thomas Swan, Nano-C, and Zeon Corporation). The concentration of the nitric acid, the reflux time, and temperature were optimized based on the starting CNT material. For example, CNTs were refluxed in concentrated nitric acid (40%) at 120° C. for 4-14 hours. After the nitric acid reflux step, the CNT suspension in acid was diluted in 0.35 to 3% nitric acid solution (8-16 L) and taken through several passes of cross-flow filtration (CFF). First few passes of CFF (hereinafter called CFF1) may remove the acid and soluble metal salts in the suspension. The pH of the suspension during the CFF1 steps was maintained at 1+/−0.3 by recovering the material in 0.35-3% nitric acid after each step. Typically, five to eleven CFF1 steps were performed. After the CFF1 steps, the retentate was collected in DI water and the pH of the nanotube:DI water suspension was increased to 8+/−0.2 with ammonium hydroxide (concentration 29%) and sonicated. This liquid was taken through another set of CFF passes (hereinafter referred as CFF2). CFF2 may remove the amorphous carbon impurities in the solution. After the CFF2 process, the retentate was collected in DI water and the pH of the nanotube:DI water liquid was adjusted to pH 8+/−0.2 and the solution was sonicated for 120 minutes in a chilled sonicator bath (4-5° C.).

At this step of the process a desired concentration or optical density of the CNT formulation can be achieved by controlling the volume of the DI water used to recover the retentate from the CFF2 membrane. For example, if the optical density of the CNT formulation before the last CFF2 step is 2 and the volume is 2 L, then a recovery volume of 1 L can lead to an optical density close to 4 assuming there is negligible loss in optical density through the permeate at this point. Similarly, if the optical density of the CNT formulation before the last CFF2 step is 2 and the volume is 16 L, then a recovery volume of 1 L can lead to a CNT formulation of optical density 32. The concentration of the CNT formulation (optical density) that can be practically achieved is dependent on, but is not limited to, the starting CNT charge used in the reaction, the reaction conditions, number of CFF steps, CFF membrane pore size, CFF membrane surface area, and pH.

Finally, the formulation was centrifuged two or three times at about 70000-100000 g for about 20-30 min each. In certain cases, the pH of the formulation was adjusted to 8+/−0.2 in between the centrifugation passes which may remove residual metal or carbon nanoparticles in the liquid by sedimentation. After the centrifugation step, the supernatant was collected and used as the final purified nanotube formulation. The concentration of the final nanotube application solution depends on the centrifugation conditions used. Typically for a spin coat application, CNT solutions with an optical density of 10-100 measured at 550 nm wavelength and a pH of 7+/−0.5 were used.

For all operations, the spin coating operations were as follows. A raw wafer was pre-baked on a 250° C. hot plate for five minutes. After cooling, the wafer was placed in spin-coat tool and underwent a pre-wet step where approximately 3 mL of de-ionized water was dispensed onto the wafer, and then spun for approximately 3 s and slung off at 280 rpm. After this pre-wet step, approximately 3 ml of the adjusted solution was dispensed onto the wafer while the wafer was rotated at 60 rpm. Following this solution dispensing step, the wafer then went through a series of steps with various spin speeds (35-180 rpm) to ensure the solution was spread evenly across the wafer during the spin coat process. Finally, the spin speed was increased up to 2000 rpm for ten seconds. The wafer was placed on a 250° C. hot plate for three and a half minutes between each spin coating operation. After a cool down cycle, the entire process was repeated such as to apply the desired number of coats of the application solution over the wafer.

For the first sample nanotube fabric (a non-porous fabric used as a control within the present example), the nanotube application solution formed as described above was adjusted such that it contained carbon nanotubes at a concentration level of 650 ppm (equivalent to OD 20, using the nanotube density method described above). It was then adjusted to have a $NH_4NO_3$ (ammonium nitrate) concentration of 86 ppl (15 ppm as N). As this solution was intended as a control, no fuel material was introduced into the solution. This adjusted solution was then applied in three spin coating operations to form first sample nanotube fabric 1301 shown in FIG. 13A. The SEM image of FIG. 13A was then analyzed with an imaging processing algorithm to isolate the pores visible within the fabric. The result of this imaging processing algorithm is shown in pore image 1302 of FIG. 13B, which was then used to calculate the pore count, pore size, and porosity percentage of first sample nanotube fabric 1301. As summarized in FIG. 12, first sample nanotube fabric (a non-porous fabric) had a total of 423 pores visible, with an average pore size of 44 nm and porosity percentage of approximately 1%.

The second sample nanotube fabric within this example was a porous fabric formed using the methods of the present disclosure with a porogen-loaded nanotube application solution having a relatively low volume of oxidizer material. The porogen-loaded nanotube application solution was formed as described above, then adjusted such that it contained carbon nanotubes at a concentration level of 650 ppm (equivalent to OD 20, using the nanotube density method described above). It was then adjusted to have a $NH_4NO_3$ (ammonium nitrate, an oxidizer material) concentration of 86 ppm (15 ppm as N) and Poloxamer 407 (a block copolymer porogen fuel material) concentration of 500 ppm. This adjusted solution was then applied in three spin coating operations and heated to form first sample nanotube fabric 1401 shown in FIG. 14A. The SEM image of FIG. 14A was then analyzed with an imaging processing algorithm to isolate the pores visible within the fabric. The result of this imaging processing algorithm is shown in pore image 1402 of FIG. 14B, which was then used to calculate the pore count, pore size, and porosity percentage of first sample nanotube fabric. As summarized in FIG. 12, second sample nanotube fabric (a porous fabric formed using a relatively low level of oxidizer material) had a total of 899 pores visible, with an average pore size of 57 nm and porosity percentage of approximately 3%. As compared with the sample control fabric (shown in FIGS. 13A and 13B), even using a relatively low concentration of oxidizer material, this second sample fabric exhibited both an increased number of pores and those pores having a larger average size. As such the porosity of sample fabric 2 is significantly increased as compared to sample fabric 1 (approximately 3% vs. 1%, respectively).

The third sample nanotube fabric within this example was a porous fabric formed using the methods of the present disclosure with a porogen-loaded nanotube application solution having a relatively high volume of oxidizer material. The porogen-loaded nanotube application solution was formed as described above, then adjusted such that it contained carbon nanotubes at a concentration level of 650 ppm (equivalent to OD 20, using the nanotube density method described above). It was then adjusted to have a $NH_4NO_3$ (ammonium nitrate, an oxidizer material) concentration of 285 ppm (50 ppm as N) and Poloxamer 407 (a porogen fuel material) concentration of 500 ppm (the same fuel material concentration as sample 2). This adjusted solution was then applied in three spin coating operations and then heated to form first sample nanotube fabric 1501 shown in FIG. 15A. The SEM image of FIG. 15A was then analyzed with an imaging processing algorithm to isolate the pores visible within the fabric. The result of this imaging processing algorithm is shown in pore image 1502 of FIG. 15B, which was then used to calculate the pore count, pore size, and porosity percentage of third sample nanotube fabric 1501. As summarized in FIG. 12, third sample nanotube fabric 1501 (a porous fabric formed using a relatively high level of oxidizer material) had a total of 1743 pores visible, with an average pore size of 95 nm and porosity percentage of approximately 9%. As compared with both the control sample fabric (shown in FIGS. 13A and 13B) and the low-oxidizer sample fabric (shown in FIGS. 14A and 14B), by using a relatively high concentration of oxidizer material, this third sample fabric exhibited significant increases over sample fabrics 1 and 2 both in number of pores and average pore size. As such the porosity of sample fabric 3 is increased three-fold compared to sample fabric 2, and nearly ten-fold compared to sample fabric 1.

Example 2

Figure 16:
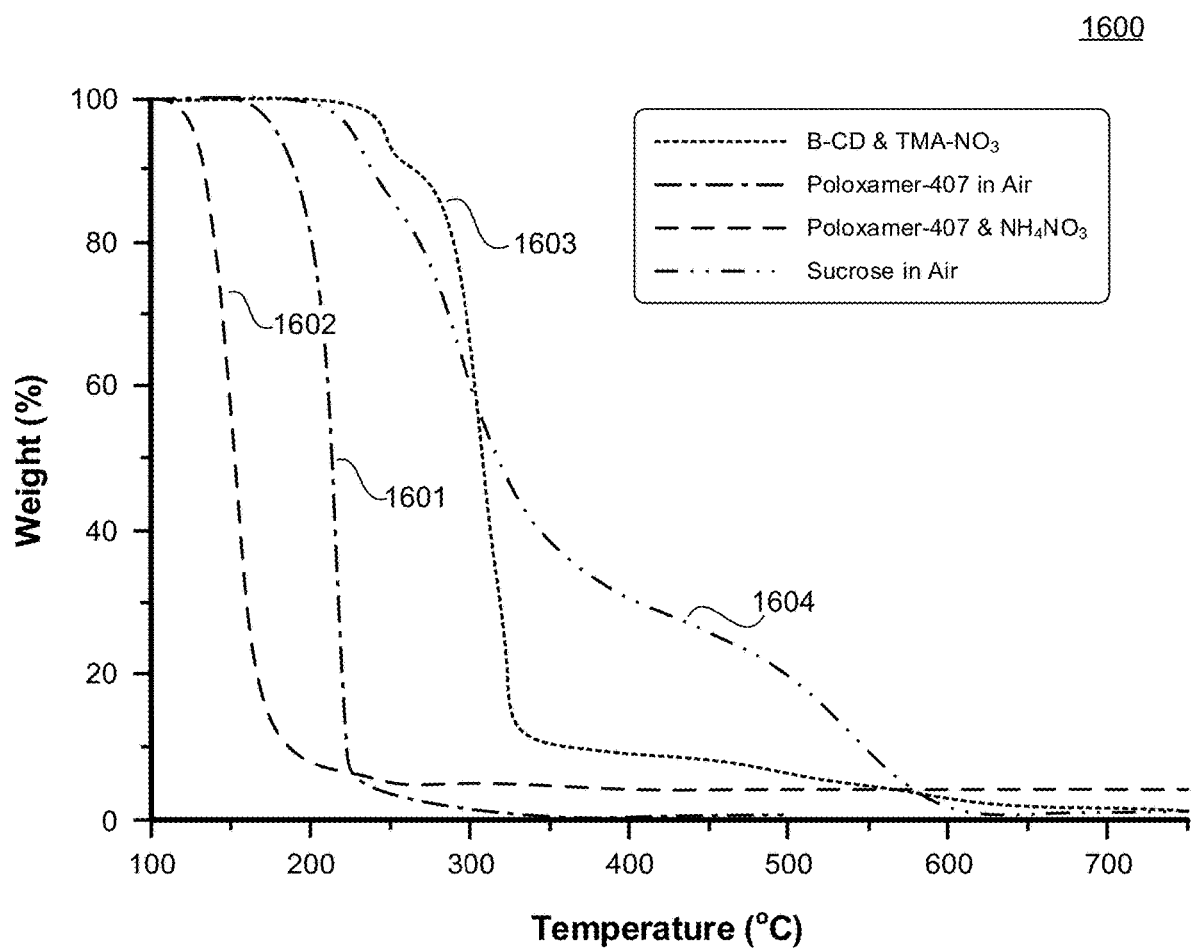
FIG. 16 is a plot summarizing the results of a second example of the present disclosure that compares the volatilization of different fuel material and oxidizer material combinations.

FIG. 16 is a plot 1600 showing the results from four tests comparing the different methods of the present disclosure (as described in detail above). As described above, the different methods of the present disclosure can be used to react fuel material with oxidizer material to create in-situ reactions which volatize the fuel material and render the porogen-loaded fabrics into porous nanotube fabrics. As described above, in certain applications it is desirable that this in-situ reaction volatizes substantially all of the fuel material within the porogen-loaded nanotube fabric, leaving essentially no fuel material in the porous nanotube fabric. Curves 1601, 1602, 1603, and 1604 show the results from four different tests where fuel material was reacted with oxidizer material in the absence of any nanotube elements. In this way, the weight of the remaining fuel material could be measured against ambient temperature to illustrate both the temperature required for the inducement of in-situ volatilization and the efficiency of the reaction.

Curve 1601 shows the results from a test employing the fourth method of the present disclosure for forming a porous nanotube fabric as described above with respect to FIGS. 8A, 8B, and 9. As described above with respect to those figures, within this method a thermally decomposable fuel material is combined with nanotube elements to form a porogen-loaded nanotube application solution, which is then deposited to form a porogen-loaded nanotube fabric. This porogen-loaded nanotube fabric is then placed into an environment and the temperature is increased to induce in-situ volatilization. Within this example, a volume of Poloxamer-407 (a thermally decomposable porogen fuel material) was used. The ambient temperature was then increased at 10° C. per minute. As shown in the plot 1600 of FIG. 16, for this test (curve 1601) volatilization occurred around an ambient temperature of approximately 200° C., and substantially all of the fuel material was volatized.

Curve 1602 shows the results from a test employing a combination of the first and second methods of the present disclosure for forming a porous nanotube fabric, as described above with respect to FIGS. 2A, 2B, and 3 and FIGS. 8A, 8B, and 9. Within this test (curve 1602), Poloxmaer-407 (a thermally decomposable porogen fuel material) was combined with an oxidizer material (as described with respect to FIGS. 2A, 2B, and 3 above). As shown in plot 1600, this combined method (curve 1602) decreased the temperature required to volatize the fuel material, which occurred around an ambient temperature of approximately 150° C. as compared to approximately 200° C. using Poloxamer-407 alone (curve 1601). Within this test, approximately 5% of the material remained post reaction, but this was substantially all unreacted oxidizer material (ammonium nitrate).

Finally, curve 1603 shows the results from employing the first method of the present disclosure, as described above with respect to FIGS. 2A, 2B, and 3. As described above with respect to those figures, within this method both a fuel material and an oxidizer material are combined with nanotube elements to form a porogen-loaded nanotube application solution, which was then deposited to form a porogen-loaded nanotube fabric. This porogen-loaded nanotube fabric was then placed into an environment where the temperature is increased to induce an in-situ reaction. Within this example, a volume of 2-hp-β-cyclodextrin (a fuel material, "β-CD") was mixed with a volume of tetramethyl ammonium nitrate (an oxidizer material, "TMA-$NO_3$"). The ambient temperature around the mixture material was then increased at 10° C. per minute. As shown in the plot 1600 of FIG. 16, for this test (curve 1603) volatilization occurred around an ambient temperature of approximately 300° C., and substantially all of the fuel material was volatized.

Curve 1604 shows the results from a test employing the fourth method of the present disclosure for forming a porous nanotube fabric as described above with respect to FIGS. 8A, 8B, and 9. As described above with respect to those figures, within this method a thermally decomposable fuel material is combined with nanotube elements to form a porogen-loaded nanotube application solution, which is then deposited to form a porogen-loaded nanotube fabric. This porogen-loaded nanotube fabric is then placed into an environment and the temperature is increased to induce in-situ volatilization. Within this example, a volume of sucrose (a thermally decomposable porogen fuel material) was used. The ambient temperature was then increased at 10° C. per minute. As shown in the plot 1600 of FIG. 16, for this test (curve 1604) volatilization occurred with two peaks: first around an ambient temperature of approximately 200° C. (wherein the sucrose decomposed into fructose and glucose) and then around an ambient temperature of approximately 350° C. (wherein the material decomposed into $CO_2$ and $H_2O$), and substantially all of the fuel material was volatized.

Although the present invention has been described in relation to particular embodiments thereof, many other variations and modifications and other uses will become apparent to those skilled in the art. It is preferred, therefore, that the present invention not be limited by the specific disclosure herein, but rather be defined by the appended claims; and that these claims will encompass modifications of and improvements to what has been described.

The invention claimed is:

1. A method for forming a porous nanotube fabric, comprising:
   combining a first volume of nanotube elements and a second volume of fuel material in a liquid medium to form a porogen-loaded nanotube application solution;
   depositing said porogen-loaded nanotube application solution over a material layer to form a porogen-loaded nanotube fabric;
   heating said porogen-loaded nanotube fabric to induce in-situ volatilization of said fuel material within said porogen-loaded nanotube fabric to form a porous nanotube fabric;
   wherein substantially all of said fuel material is volatized.

2. The method of claim 1 wherein said step of combining further comprises combining a third volume of oxidizer material to form said porogen-loaded nanotube application solution.

3. The method of claim 2 wherein said step of heating induces a chemical reaction of said fuel material with said oxidizer material.

4. The method of claim 3 wherein substantially all of said oxidizer material is volatized.

5. The method of claim 2 wherein said oxidizer material is tetramethyl ammonium nitrate and said fuel material is 2-hydroxypropyl-β-cyclodextrin.

6. The method of claim 5 wherein said step of heating comprises exposing said porogen-loaded nanotube fabric layer to an environment with an ambient temperature of 350 degrees Celsius.

7. The method of claim 2 wherein said oxidizer material is ammonium nitrate and said fuel material is a block copolymer.

8. The method of claim 7 wherein said step of heating comprises exposing said porogen-loaded nanotube fabric layer to an environment with an ambient temperature of 200 degrees Celsius.

9. The method of claim 2 wherein said oxidizer material is ammonium nitrate and said fuel material is sucrose.

10. The method of claim 9 wherein said step of heating comprises exposing said porogen-loaded nanotube fabric layer to an environment with an ambient temperature of 200 degrees Celsius.

11. The method of claim 1 wherein said fuel material has a molecular structure that includes a fuel part and an oxidizer part.

12. The method of claim 11 wherein said in-situ volatilization results from a chemical reaction of said fuel part with said oxidizer part under said applied heat.

13. The method of claim 11 where said fuel material is one of benzoyl peroxide and ethylhydrazine oxalate.

14. The method of claim 13 wherein said step of heating comprises exposing said porogen-loaded nanotube fabric layer to an environment with an ambient temperature of 200 degrees Celsius.

15. The method of claim 1 wherein said step of heating is performed with said porogen-loaded fabric exposed to an atmosphere that includes an ambient oxidizer.

16. The method of claim 15 wherein said step of heating induces a chemical reaction of said fuel material with said ambient oxidizer.

17. The method of claim 15 wherein said fuel material is block copolymer and said atmosphere is air.

18. The method of claim 17 wherein said step of heating comprises exposing said porogen-loaded nanotube fabric layer to an environment with an ambient temperature of 250 degrees Celsius.

19. The method of claim 15 wherein said fuel material is block copolymer and said atmosphere is one of $NO_2$, $N_2O$, air, or mixtures thereof.

20. The method of claim 19 wherein said step of heating comprises exposing said porogen-loaded nanotube fabric layer to an environment with an ambient temperature of 200 degrees Celsius.

21. The method of claim 1 wherein said fuel material is a material that will thermally decompose under applied heat.

22. The method of claim 21 wherein said step of heating is performed with said porogen-loaded nanotube fabric in an inert atmosphere.

23. The method of claim 22 wherein said inert atmosphere is nitrogen.

24. The method of claim 21 wherein said fuel material is one of a block copolymer, a sugar, or polyvinyl alcohol.

25. The method of claim 24 wherein said step of heating comprises exposing said porogen-loaded nanotube fabric layer to an environment with an ambient temperature of 400 degrees Celsius.

26. The method of claim 1 wherein the porosity of said porous nanotube fabric is above a selected threshold value.

27. The method of claim 26 wherein said threshold value is one of 3%, 5%, 10%, 15%, and 20%.

28. The method of claim 1 wherein said nanotube elements are carbon nanotubes.

29. The method of claim 28 wherein said carbon nanotubes are one of singled walled carbon nanotubes, multi-walled carbon nanotubes, or mixtures thereof.

* * * * *